United States Patent [19]
Sangveraphunsiri et al.

[11] Patent Number: 5,778,252
[45] Date of Patent: Jul. 7, 1998

[54] ON-BOARD INTERFACE FOR CONCURRENT SEEKS OF MULTIPLE DISK DRIVES OF A COMPUTER

[75] Inventors: Vic Sangveraphunsiri, San Clemente; Felix Pinai, Fountain Valley; Thomas Shu, Lake Forest; Cameron Spears, Diamond Bar, all of Calif.

[73] Assignee: Advanced Research Logic, Inc., Irvine, Calif.

[21] Appl. No.: 677,937

[22] Filed: Jul. 10, 1996

Related U.S. Application Data

[63] Continuation of Ser. No. 353,336, Dec. 5, 1994, Pat. No. 5,590,375, which is a continuation of Ser. No. 935,713, Aug. 27, 1992, abandoned, which is a continuation-in-part of Ser. No. 926,675, Aug. 10, 1992, abandoned.

[51] Int. Cl.$^6$ ............... G06F 7/00; G06F 13/00
[52] U.S. Cl. ............ 395/841; 395/441; 364/236.2; 364/243; 364/243.7; 364/248.1; 364/256.8
[58] Field of Search .......... 395/182.04, 182.05, 395/441, 840, 841; 369/14

[56] References Cited

U.S. PATENT DOCUMENTS

| | | | |
|---|---|---|---|
| 3,623,006 | 11/1971 | Balakian et al. | 340/172.5 |
| 3,893,178 | 7/1975 | Sordello | 360/73 |
| 4,240,015 | 12/1980 | White | 318/338 |
| 4,270,154 | 5/1981 | Crawford | 360/98 |
| 4,414,591 | 11/1983 | Wenner | 360/99 |
| 4,415,970 | 11/1983 | Swenson | 395/452 |
| 4,494,196 | 1/1985 | Greer | 395/880 |
| 4,528,626 | 7/1985 | Dean et al. | 395/848 |
| 4,590,559 | 5/1986 | Baldwin et al. | 364/414 |
| 4,638,189 | 1/1987 | Grannopoulus et al. | 307/465 |
| 4,644,515 | 2/1987 | Allebest | 369/32 |
| 4,670,714 | 6/1987 | Sievers et al. | 324/133 |
| 4,688,198 | 8/1987 | Wiggins | 367/46 |
| 4,701,896 | 10/1987 | Allebest | 369/32 |
| 4,817,035 | 3/1989 | Timsit | 395/183.07 |
| 4,858,038 | 8/1989 | Kazama | 360/69 |
| 4,870,643 | 9/1989 | Bultman et al. | 395/182.05 |
| 4,910,614 | 3/1990 | Arai et al. | 360/69 |

(List continued on next page.)

OTHER PUBLICATIONS

Dr. Jerry Lake, "Systems Effectiveness", Defense Systems management College, Systems Engineering Management Department FIG. 1 (Jul. 1992).
Murray Sargent & Richard Shoemaker, "The IBM Personal Computer From Die Inside Out" p. 398 (Rev. Ed. 1986).
Jerry M. Rosenburg, "Dictionary of Computers Information Processing and Telecommunications" p. 628 (2d ed. 1987).
Dell Computer Corporation, Dell, Summer 1991 p. 35.

Primary Examiner—Lance Leonard Barry
Attorney, Agent, or Firm—Reid & Priest L.L.

[57] ABSTRACT

An interface allows a given CPU (Central Processing Unit) to communicate concurrently with a large number of disk drives in a high-performance, low-cost system. Plural seek operations can be performed concurrently, to serve a common processor. Also, heterogeneous physical drives—of any physical or logical configuration (storage capacity, number of heads, and so forth)—can be combined into one or more "logical" drives as seen by a host operating system. An "on-board" embodiment provides an "enhanced" IDE (Integrated Drive Electronics) disk drive that is an extension of the industry-standard IDE drives, allowing an arbitrary number of independently seeking IDE drives on a conventionally single-seeking, two-drive-maximum bus. In a "paddle board" embodiment, low-cost IDE drives of arbitrary physical size, storage capacity and geometry, can be combined simply and inexpensively into a high-performance storage device. For example, a 3.5" 80 MB (megabyte) drive can be transparently combined with a 2.5" 60 MB drive. The inventive concept can thus be embodied with either a "paddle board" controller (with standard IDE drives), or with no additional controller (employing "enhanced" IDE drives).

10 Claims, 18 Drawing Sheets

U.S. PATENT DOCUMENTS

| | | | |
|---|---|---|---|
| 4,920,506 | 4/1990 | Castelaz | 364/602 |
| 4,935,828 | 6/1990 | Frissell | 360/78.04 |
| 4,989,206 | 1/1991 | Dunphy | 395/182.05 |
| 5,033,061 | 7/1991 | Hobart et al. | 372/107 |
| 5,043,606 | 8/1991 | Lewis | 367/725 |
| 5,058,004 | 10/1991 | Ravid | 395/822 |
| 5,097,439 | 3/1992 | Patriquin et al. | 395/402 |
| 5,104,612 | 4/1992 | Kaplinsky | 307/272.2 |
| 5,127,088 | 6/1992 | Takaki | 395/439 |
| 5,150,465 | 9/1992 | Bush et al. | 395/834 |
| 5,191,584 | 3/1993 | Anderson | 371/51.1 |
| 5,202,979 | 4/1993 | Hillis et al. | 395/182.04 |
| 5,205,810 | 4/1993 | Guiraydon et al. | 600/16 |
| 5,239,445 | 8/1993 | Parks et al. | 361/729 |
| 5,271,012 | 12/1993 | Blaum et al. | 395/182.04 |
| 5,274,507 | 12/1993 | Lee | 360/39 |
| 5,276,808 | 1/1994 | Cheney et al. | 395/250 |
| 5,297,258 | 3/1994 | Hale et al. | 395/441 |
| 5,301,310 | 4/1994 | Isman et al. | 395/182.03 |
| 5,404,454 | 4/1995 | Parks | 395/841 |
| 5,473,761 | 12/1995 | Parks et al. | 395/404 |

| TASK ID | HOST PRIORITY | STATUS | ASSOC INT | RW BUFFPTR |
|---|---|---|---|---|
| 0 | 5 | PENDING | 2 | 0x 3428 |
| 1 | 2 | RETRIED | 1 | 0x 3049 |
| 2 | 1 | SUCCESS | 3 | 0x 2010 |
| ⋮ | | | | |
| n | | | | |

FIG. 12

| LOGICAL SECTOR | CHANNEL | PHYSICAL SECTOR |
|---|---|---|
| 200 | 1 | 311 |
| 319 | 2 | 150 |
| 135 | 3 | 901 |
| | | |
| | | |

FIG. 13

| 7 | 6 | 5 | 4 | 3 | 2 | 1 | 0 | |
|---|---|---|---|---|---|---|---|---|
| X | X | X | X | 0 | 0 | 0 | 0 | TRANSACTION 0 |
| X | X | X | X | 1 | 0 | 1 | 1 | TRANSACTION 1 |
| X | X | X | X | 0 | 0 | 0 | 0 | TRANSACTION 2 |
| | | | | | | | | ⋮ |
| X | X | X | X | 1 | 1 | 1 | 1 | TRANSACTION n |

FIG. 14

ON-BOARD INTERFACE FOR CONCURRENT SEEKS OF MULTIPLE DISK DRIVES OF A COMPUTER

CROSS-REFERENCE TO RELATED APPLICATION

The present patent application is continuation of U.S. patent application Ser. No. 08/353,336, filed Dec. 5, 1994, now U.S. Pat. No. 5,590,375, issued Dec. 31, 1996, which was a file wrapper continuation of application Ser. No. 07/935,713, filed Aug. 27, 1992 (now abandoned), which was a continuation-in-part (CIP) of U.S. patent application Ser. No. 07/926,675, filed Aug. 10, 1992 (now abandoned).

This application is also related to allowed U.S. application Ser. No. 08/429,167, filed Apr. 26, 1995 as a divisional of application Ser. No. 08/353,336 (mentioned above).

BACKGROUND OF THE INVENTION

1. Field of the Invention

The present invention relates to interfaces between processors and peripheral devices. More specifically, the invention relates to interfaces between processors and disk drives which allow a larger number of disk drives to be controlled by a single processor and an existing disk controller, thereby allowing concurrent seeks on more than one drive.

2. Related Art

Various patents disclose control schemes for storage media.

For example, U.S. Pat. No. 3,623,006 (Balakian et al.) shows an early example of a "disk file optimizer" which selects a most optimum request for execution based on minimum latency time. U.S. Pat. No. 3,893,178 (Sordello) provides synchronized rotation of several disks to minimize latency time, when switching from one disk to another. U.S. Pat. No. 4,270,154 (Crawford) discloses a system in which several heads (or stacks of heads) are provided to minimize latency time.

In U.S. Pat. No. 4,494,196 (Greer), a controller 20 is disposed between a central processor unit 10 and N peripheral data storage units 12-1 through 12-N. The Greer controller focuses on controlling data storage devices having different data transfer rates, using a corresponding number of instruction storage units.

U.S. Pat. No. 4,858,038 (Kazama) discloses a set of disk drive selector circuits for a disk drive controller which allow different "types" of disk drives to be selected.

U.S. Pat. No. 4,910,614 (Arai et al.) discloses a disk controller which is disposed between a host processor and several disk drives of different types. The focus of the Arai et al. patent is the presence of two types of memories: a first type of memory in one-to-one correspondence with the disk drive units, and a second set of memories defining the types of disk drives.

U.S. Pat. No. 4,935,828 (Frissell) discloses a seek multitasking disk controller in which a disk control unit 102 (Frissell's FIG. 2) is disposed between a CPU 201 and several disk drives 104, 106. As explained with reference to Frissell's FIGS. 6 and 7, during a time when a data transfer command is deferred in one disk drive, a seek command may be addressed to another disk drive. The Frissell multitasking controller depends heavily on the relative location of the head and sectors on one of the disk drives.

Finally, U.S. Pat. No. 5,097,439 (Patriquin et al.) is directed to interfacing several disk drives to an AT™-based host computer. The Patriquin et al. patent focuses on a "subsystem" which is an interface between the host computer's buses and many disk drive "clusters", the subsystem allowing substantial expansion. The Patriquin et al. system may carry out seeks concurrently in more than one disk drive.

From the foregoing patents, it is apparent that various schemes for handling more than one recording medium are known in the art. However, the known system possess one or more disadvantage which are of concern from either or both a cost or performance standpoint. For example, it is known in the art that additional drives may be added to a given computer system, but only through costly addition of additional software drivers. Alternatively, a known solution is to adapt a given disk drive to such a system, but this adaptation of the disk drive's interface is also costly. Moreover, the addition of a larger number of disk drives to a system has often slowed the performance of the overall system, even in those which conceivably could perform concurrent seek operations in different disk drives.

FIG. 1 illustrates an ISA/EISA (Industry Standard Architecture/Extended Industry Standard Architecture) bus 100 connected in a standard configuration to first IDE (Integrated Drive Electronics) drive 110 and a second IDE drive 112 via an IDE interface/connector 104. The ISA/EISA bus 100 is controlled by a processing unit such as CPU (Central Processing Unit) 102.

On a standard IDE interface, at most two drives can be connected to the ISA/EISA bus. In the known arrangement illustrated in FIG. 1, the CPU selects one of the drives 110, 112 by setting bit 4 of I/O register 1F6H to 0 or 1. This bit enables I/O (Input/Output) decoding to the address ranges 1F0H–1F7H and 3F6H–3F7H, as well as to select the source of interrupt line IRQ14 used for disk I/O in ISA/EISA systems. In this known arrangement, only one IDE disk drive can be selected at any given time. One operation must be completed on a first disk drive, before another operation can begin with respect to another drive. Therefore, concurrent multi-seek operations cannot be performed at all in two disk drives in the arrangement illustrated in FIG. 1.

The FIG. 1 arrangement including an existing IDE interface with a maximum of two disk drives is adequate for operating systems such as MS-DOS™, because the environment requires only sequential disk accesses. However, in other operating systems, such as MICROSOFT™ WINDOWS™, NOVELL™ NETWARE™ or UNIX™, concurrent requests may be pending due to multi-tasking and multi-user capability. If an operating system desires access to more than one disk drive at a time, or if commands are desired to be sent to different disk drives simultaneously, concurrent seeking on more than one disk drive is required. If this can be achieved, faster data acquisition is possible, and the system would have higher performance than one with a sequential request access.

As described to some extent in the above-listed patents, as well as in the SCSI (Small Computer System Interface) controllers, seeks can be performed on more than one disk drive at a time. However, the cost of the SCSI controller is high, and the SCSI protocol interface involves substantial overhead. To date, there is no known system in which multi-seek operations can be performed while minimizing both cost and overhead. It is especially desirable to provide this multi-seek capability on disk drives which do not require special interface hardware or software, but may employ a conventional (for example, IDE) interface arrangement.

Therefore, there is a need in the art to provide means for interfacing a processor with more than one disk drive at the same time, thereby allowing concurrent multi-seek capability even when both drives are standard IDE drives, in a low-cost, high performance system especially suitable for multi-tasking.

SUMMARY OF THE INVENTION

The present invention overcomes the limitations of the system of FIG. 1 by providing an interface which allows a given CPU to communicate concurrently with a large number of disk drives in a high-performance, low-cost system. In particular, the present invention allows more than one seek operation to be performed at the same time, in serving a common processor.

Additionally, the present invention can combine standard physical drives of any physical or logical configuration (storage capacity, number of heads, and so forth) into one or more "logical" drives. That is, heterogeneous physical drives can be combined into one or more homogeneous "logical" drives as seen by a host operating system.

Advantageously, the present invention provides an interface which is downward compatible with the existing interface between the processor bus and the disk drives. Although the invention provides control for additional disk drives, no additional disk controller is required, resulting in considerable improvements in system cost, performance, maintenance cost, flexibility, and reliability.

The invention not only provides increased storage capacity, but also higher performance and improved price/performance ratios. The invention creates an environment, in which "standard" (lower performance) disk drives having standard interfaces not allowing concurrent seeks, may be placed, the environment allowing the various drives to independently perform concurrent seeks. In this manner, performance in accessing randomly located files is increased in a nearly proportional fashion, with n drives providing almost n times the performance of a single drive.

Supplemental enclosures external to the computer chassis, additional power supplies, special cabling, and the like, are not required to implement the present invention. Rather, standard electrical and physical interfaces (connectors and cabling) may be employed in implementing the invention, while obtaining increased capacity and performance, maintaining a storage device addressing scheme which preserves the simplicity of the CPU's addressing of data locations, achieving an improved price/performance ratio, and maintaining low cost and a small parts list.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 12 illustrates an exemplary task queue of the FIG. 11 software architecture.

FIG. 13 illustrates an exemplary sector mapping table according to the FIG. 11 software architecture.

FIG. 14 illustrates an exemplary pending interrupt table according to the FIG. 11 software architecture.

DETAILED DESCRIPTION OF THE PREFERRED EMBODIMENTS

Figure 1:
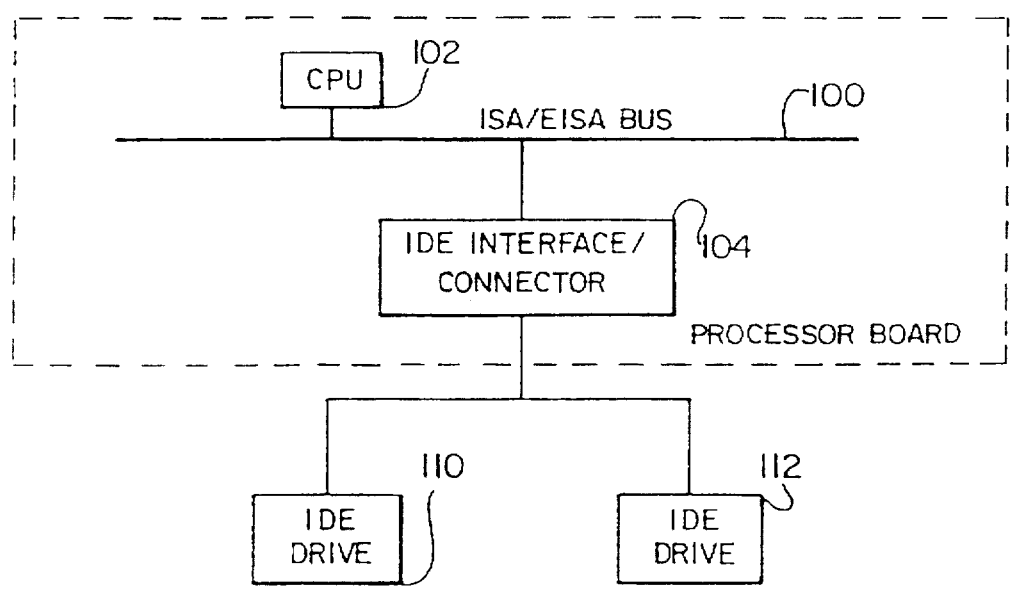
FIG. 1 is a block diagram illustrating a known arrangement of an ISA/EISA bus 110 operationally connecting a processor 102 and two disk drives 110, 112 using a conventional IDE interface.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

In addition to the more general problems addressed above, the multi-seek IDE embodiments described herein address problems of high cost and high overhead associated with interfaces such as the SCSI implementations. First, the need for an expensive SCSI controller is eliminated. In contrast, an IDE interface is standard on nearly all present-day PC/AT™ compatible systems. Second, IDE hard drives are more efficient than SCSI hard drives, requiring fewer I/O cycles per operation.

More generally, an interface according to the present invention allows a given CPU to communicate concurrently with a large number of disk drives in a high-performance, low-cost system. In particular, more than one seek operation can be performed at the same time, in serving a common processor. Additionally, the present invention can combine standard (for example, IDE) physical drives of any physical or logical configuration (storage capacity, number of heads, and so forth) into one or more logical drives. That is, heterogeneous physical drives can be combined into one or more homogeneous "logical" drives as seen by a host operating system. When applying the invention to IDE drives, a first, "on-board" embodiment provides a "multi-seek IDE disk drive" that is an extension of the industry-standard IDE drives, allowing an arbitrary number of independently seeking IDE drives on the formerly single-seeking, two-drive-maximum bus. Low-cost IDE drives of arbitrary physical size, storage capacity and geometry, can be combined simply and inexpensively into a high performance multi-seek disk drive. For example, a 3.5" 80 MB drive can be transparently combined with a 2.5" 60 MB drive.

The concept can be embodied in several implementations, such as one using a "paddle board" controller (with standard IDE drives), or another using no additional controller (but with enhanced IDE drives). These two implementations are shown respectively in block diagram form in FIGS. 2A and 2C, and in perspective view in FIGS. 2B and 2D. The multi-seek paddle board (FIGS. 2A, 2B) allows use of unmodified, conventional IDE disk drives. In contrast, the on-board implementation (FIGS. 2C, 2D) employs "enhanced" (or "multi-seek") IDE drives.

Figure 2A:
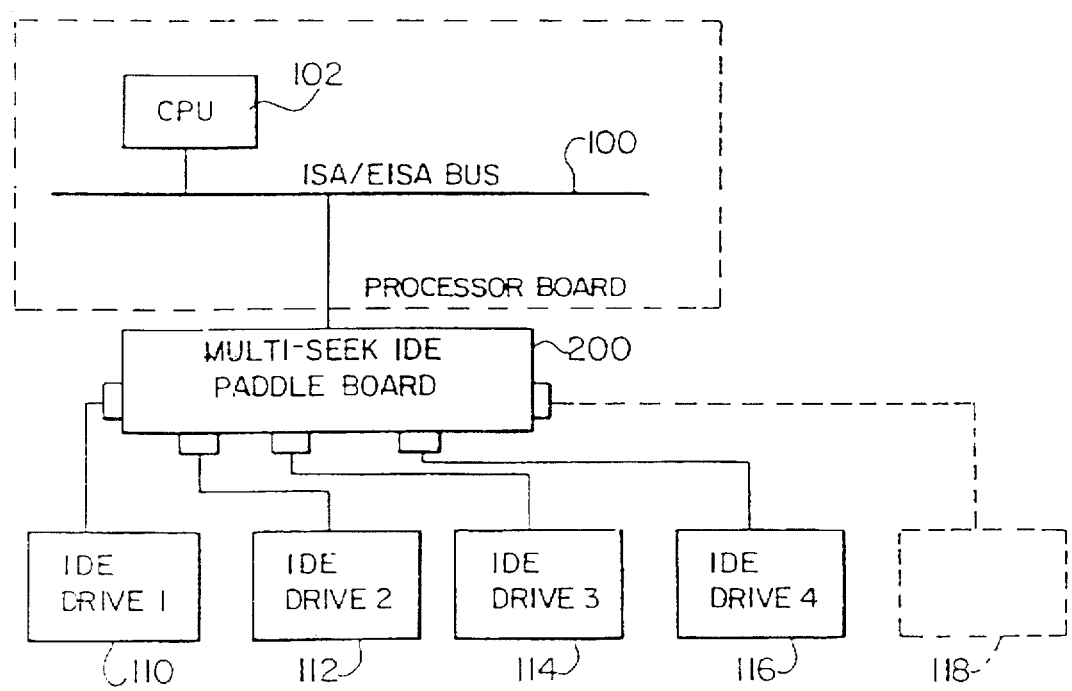
FIG. 2A is a high-level block diagram showing a "paddle board" implementation of the multi-seek unit of the present invention, the paddle board being disposed between bus 100 and a larger number of disk drives 110, 112, 114, 116.
Figure 2B:
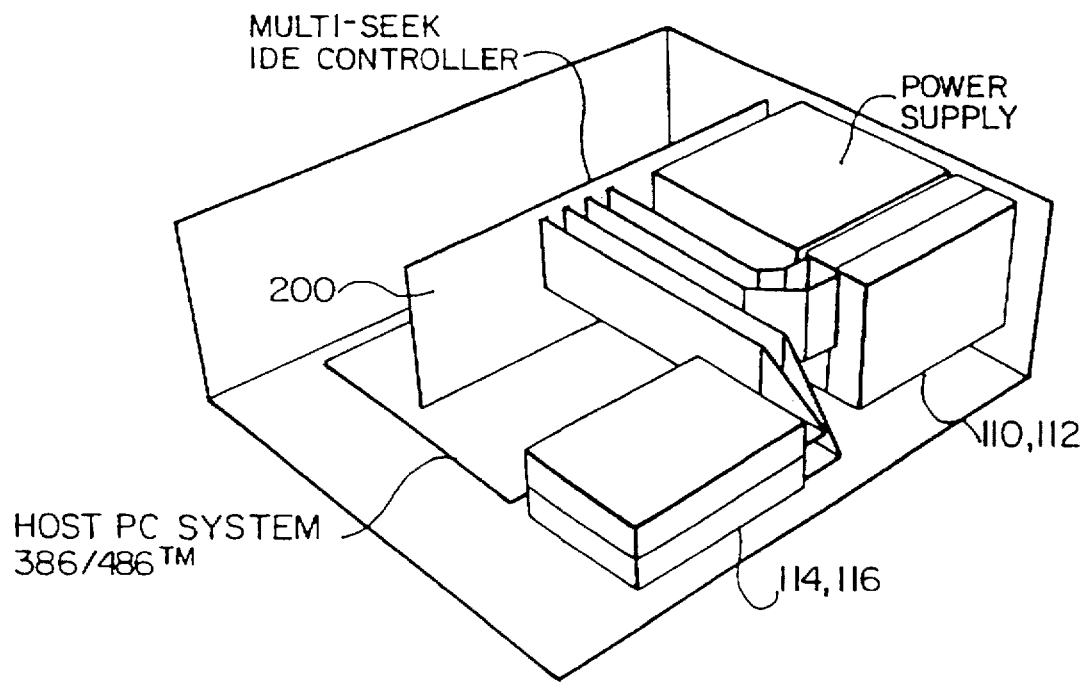
FIG. 2B is a perspective view of an embodiment of the multi-seek unit according to the paddle board embodiment, in which the multi-seek unit is on a paddle board installed in an AT™-compatible personal computer.
Figure 2D:
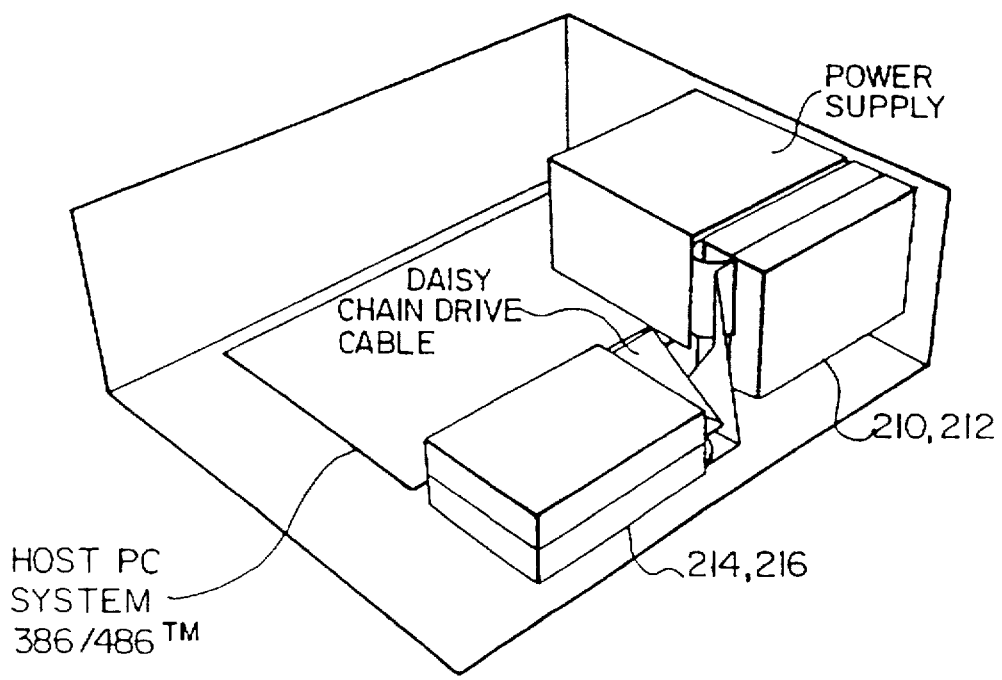
FIG. 2D is a perspective view of the "on-board" embodiment, in which drives 210, 212, 214, 216 are "daisy-chained".
Figure 2C:
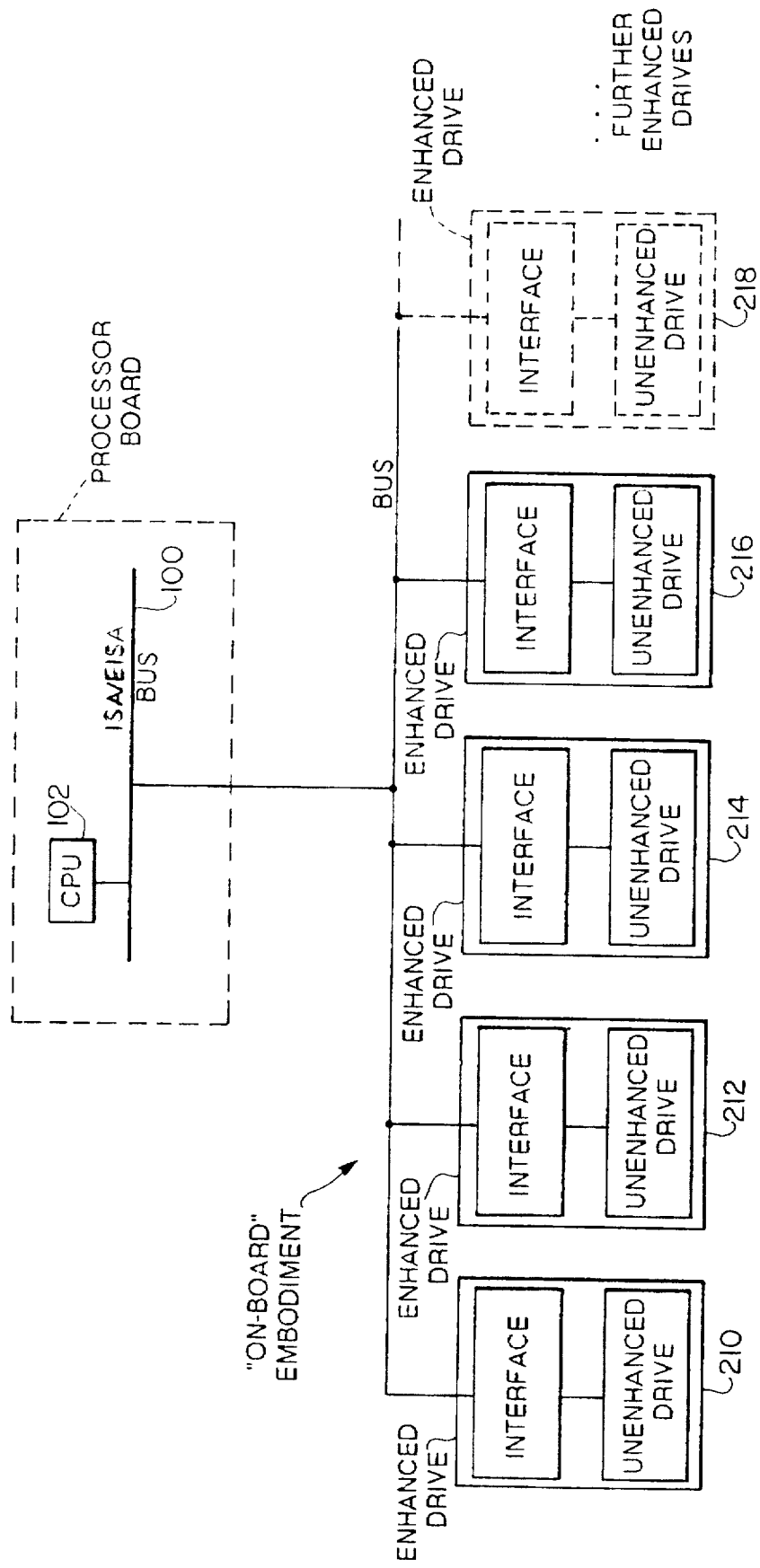
FIG. 2C is a high-level block diagram showing an "on-board" implementation of the present invention, in which the multi-seek unit uses an AT™-compatible computer's standard IDE interface in conjunction with special Multi-seek IDE hard drives.
Figure 2E:
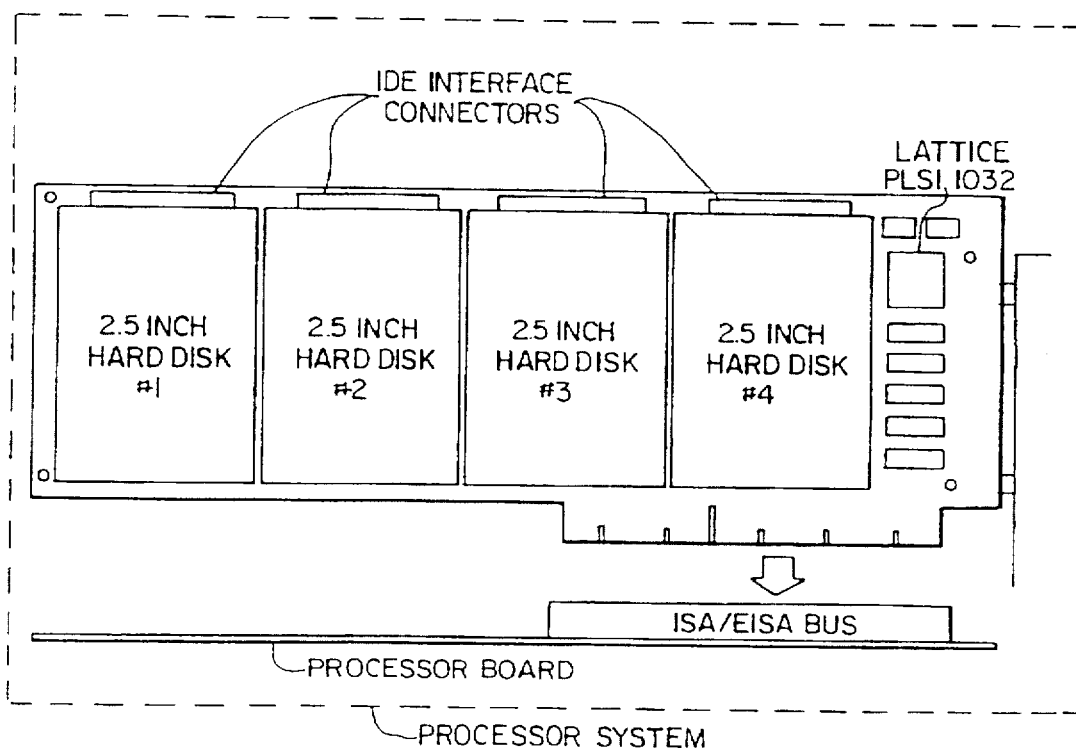
FIG. 2E illustrates an embodiment of the invention in which multiple disk drives are mounted on a single printed circuit card, all the drives being capable of concurrent seek operations serving a common processor in accordance with the "paddle board" embodiment shown in FIGS. 2A–2B, it being understood that both the paddle board embodiment (FIGS. 2A–2B) and the on-board embodiment (FIGS. 2C–2D) could be implemented on a single card.

FIG. 2E illustrates an embodiment of the invention in which multiple disk drives are mounted on a single printed circuit card, all the drives being capable of concurrent seek operations serving a common processor in accordance with the "paddle board" embodiment shown in FIGS. 2A–2B. It is understood, however, that both the paddle board embodiment (FIGS. 2A–2B) and the on-board embodiment (FIGS. 2C–2D) may be implemented on a single card.

In FIG. 2E, the board is shown poised for connection to a standard ISA/EISA bus. FIG. 2E dramatizes the invention's ability to provide plural physical disk drives in a simple configuration that presents to the system CPU a single logical disk drive of substantial aggregate storage capacity. Moreover, performance in addressing randomly located files is nearly proportional to the number of physical drives in the system, despite the fact that multiple concurrent seeks are performed without the CPU's specific supervision.

A preferred embodiment of the multi-seek unit 200 is preferably implemented using a pLSI™ 1032 Programmable Large Scale Integrated Logic Device available from LATTICE SEMI-CONDUCTOR CORP., 555 N.E. Moore Court, Hillsboro, Oreg. 97214 (telephone 1-800-LATTICE). As readily appreciated by those skilled in the art, the LATTICE pLSI™ 1032 is a programmable high-density logic device having a large number of registers, I/O pins, clock input pins, and a "global routing pool" which allows complete interconnectivity between all of the elements. This chip, readily capable of programming by those skilled in the art, enables fairly complex logic functions to be implemented without using a large number of discrete elements or integrated circuits, providing the advantage of reduced size. By reference to the LATTICE data sheet such as that dated October 1991 as well as to the accompanying description of the present invention, those skilled in the art are readily capable of implementing this multi-seek unit in a workable computer system. The October 1991 LATTICE data sheet on the pLSI™ 1032, being documentation of a type which is readily available to those skilled in the art, need not be further described herein.

Referring to FIG. 2A, a high-level block diagram of a paddle board embodiment of the present invention is illustrated. A paddle board multi-seek unit 200 embodying principles of the present invention is illustrated between ISA/EISA bus 100 and a plurality of IDE drives 110, 112, 114, and 116. A larger number of drives may readily be supported, as indicated by element 118. Comparing FIG. 2A to FIG. 1 in view of the following discussion, those skilled in the art will readily appreciate that the present invention provides greater effective storage capacity that is readily accessible to CPU 102, in a high-performance system not requiring additional software drivers associated with CPU 102 or specialized interface software in IDE drives 110–118.

FIG. 2B illustrates in perspective view a multi-seek unit in the form of a multi-seek paddle board 200. The paddle board 200 is shown plugged into the AT™ bus connector card, and extending between the bus and a rear connector allowing communication with a plurality of disk drives 110, 112, 114, 116, and so forth. In the illustrated arrangement, the various disk drives do not require any special software or hardware interface, but may include only the conventional IDE interface.

FIG. 2C is a high-level block diagram showing an "on-board" implementation of the present invention, in which the multi-seek unit uses an AT™-compatible computer's standard IDE interface in conjunction with special enhanced multi-seek IDE hard drives 210, 212, 214, 216 and so forth.

FIG. 2D illustrates in perspective view a multi-seek unit in the form of an "on-board" unit. An IDE cable connects the system processor board with a plurality of daisy-chained disk drives 210, 212, 214, 216, and so forth. The illustrated drives are preferably the "enhanced" IDE drives described with respect to FIG. 6.

The operation of the paddle board embodiment is appreciated by referring to FIG. 4 and accompanying text below; the operation of the "on-board" embodiment is appreciated by referring to FIG. 6 and accompanying text below. Moreover, a fundamental feature of the invention is that the host software for operating either embodiment remains the same (see FIGS. 11–21).

Figure 3:
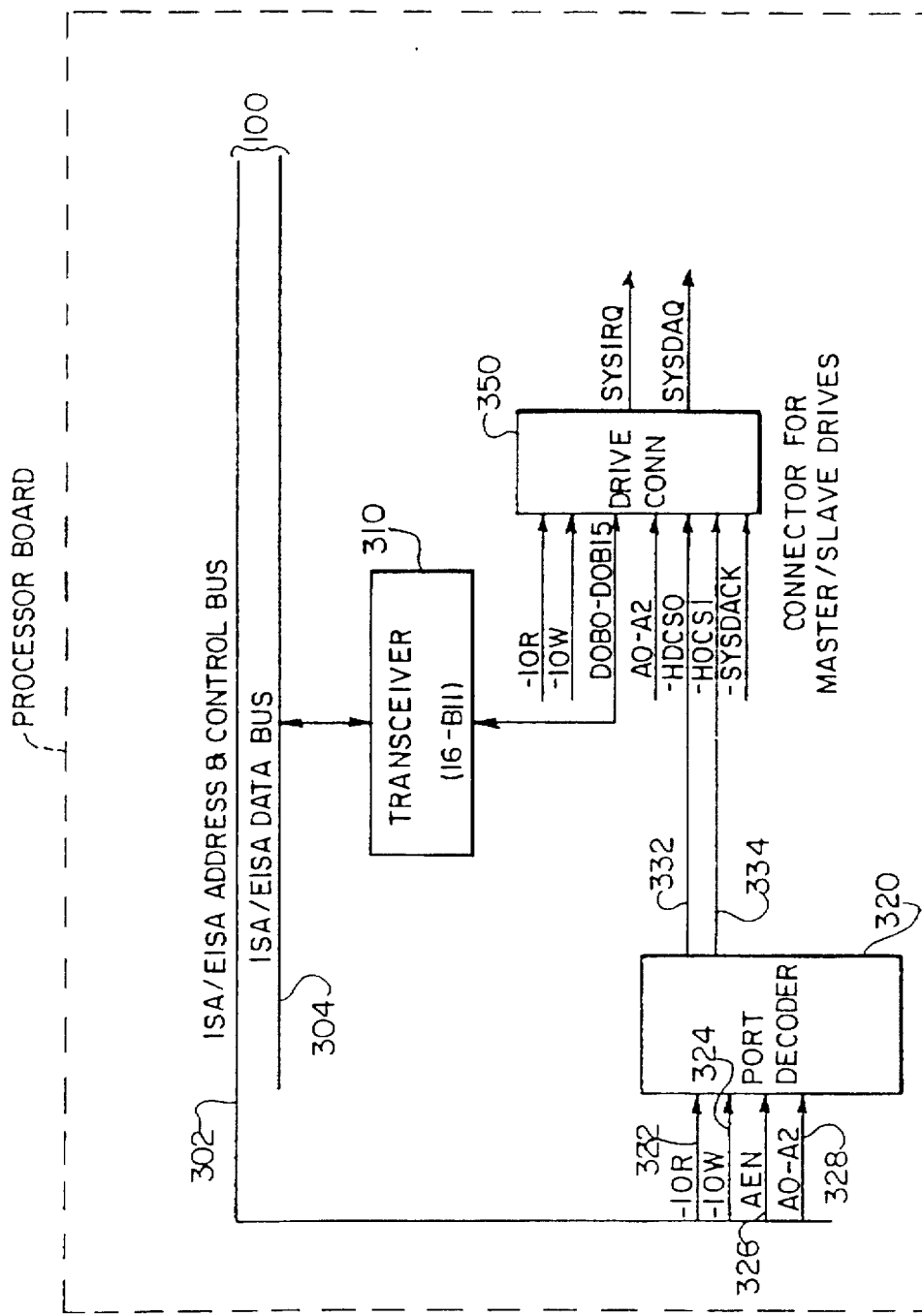
FIG. 3 illustrates in greater detail the interface in the known system of FIG. 1.

Referring now to FIG. 3, the known interface arrangement of FIG. 1 is illustrated in greater detail. In particular, ISA/EISA bus 100 is illustrated as comprising an address and control bus 302 and a data bus 304. Data passes bi-directionally through a data transceiver 310, between ISA/EISA data bus 304 and a drive connector 350 that leads directly to the disk drive.

The transfer of data is governed by control and address lines passing through port decoder 320. Port decoder 320 receives I/O read and I/O write control signals on paths 322 and 324, respectively. An address enable control signal on path 326 enables the port decoder to recognize port address signals on paths 328. Port decoder 320 outputs hard drive channel select on paths 332, 334. The hard drive channel select signals are input to drive connector 350 to govern transfer of data between transceiver 310 and the hard drive connected to drive connector 350.

As mentioned above, in the Background of the Invention, the known arrangement illustrated in FIGS. 1 and 3 allows only one of a maximum of two IDE disk drives to be accessed at any given time, in a configuration in which concurrent seek operations are not possible.

Figure 4:
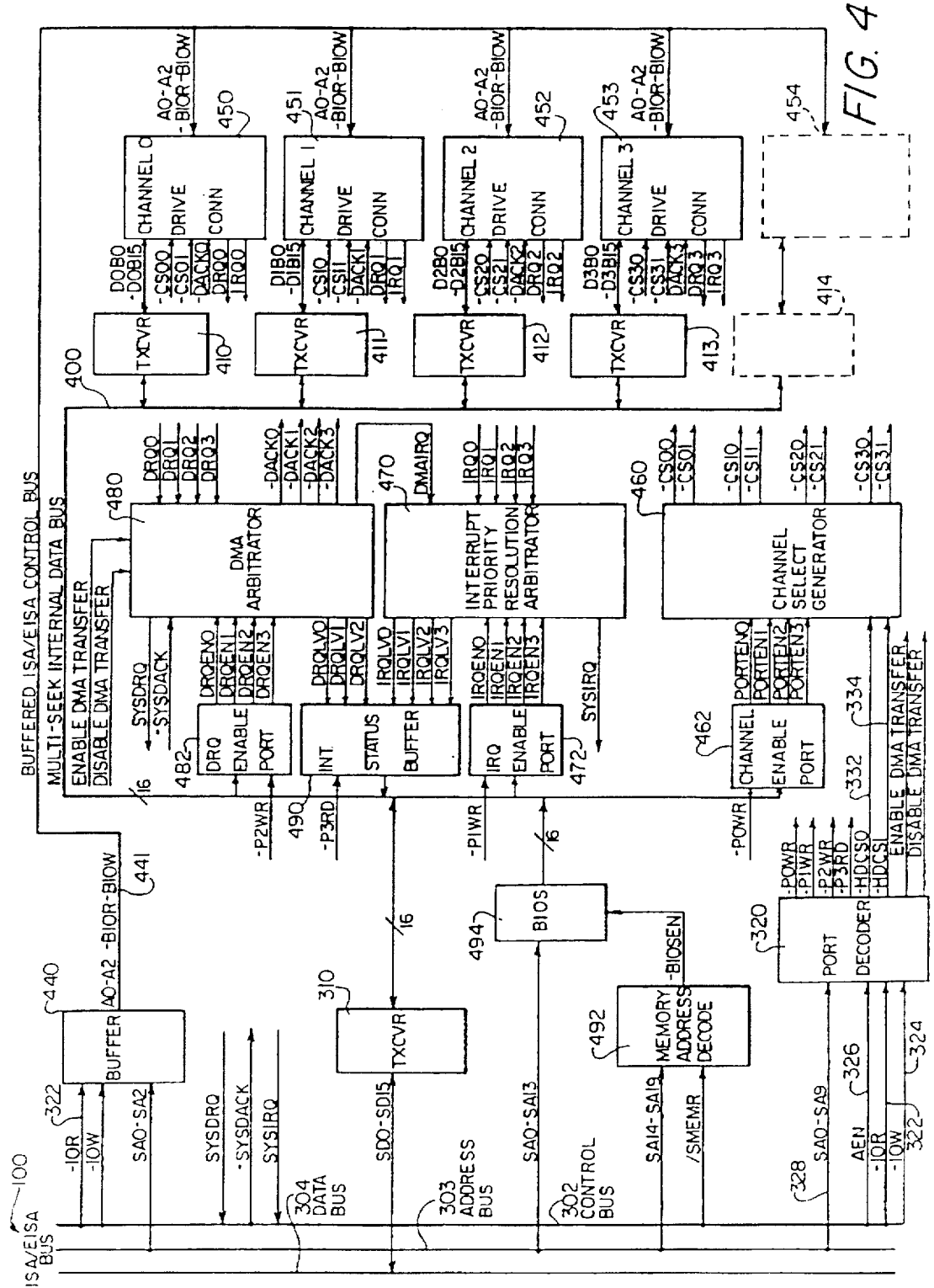
FIG. 4 is a high-level block diagram of paddle board circuitry which allows an improvement in performance over the known system in FIG. 3.

Referring now to FIG. 4, the paddle board embodiment of the invention in FIG. 2A is illustrated in greater detail. ISA/EISA control bus 302, address bus 303 and data bus 304 are connected to port decoder 320 and transceiver 310, in the same manner as in FIG. 3.

According to the invention, each paddle board card may be implemented an I/O-mapped interface card. Each card is assigned a unique I/O address (such as 0x130, 0x170, 0x1B0, 0x1F0), a unique system interrupt (such as IRQ10, IRQ11, IRQ14, IRQ15), and a unique DMA Request (such as DRQ0, DRQ5, DRQ6, DRQ7). A software driver, logically residing between the paddle board and the host processor, manages communication with the cards using each card's unique values. In a particular preferred embodiment using a commonly available computer system, this arrangement allows up to four paddle board cards to be installed simultaneously (in a single PC/ATM system).

Supplementing the conventional arrangement in FIG. 3, additional circuitry is provided in the multi-seek paddle board unit. For example, the multi-seek unit has an internal data bus 400 connecting transceiver 310 to a plurality of transceivers 410, 411, 412, and 413. Transceivers 410, 411, 412, and 413 are in turn connected to respective drive connectors 450, 451, 452, and 453. It is understood that an additional number of transceivers and drive connectors may be provided, as schematically illustrated in phantom by elements 414 and 454, respectively.

The multi-seek unit 200 also includes a channel select generator 460, an interrupt priority resolution arbitrator 470, a DMA arbitrator 480 and an interrupt status buffer 490.

Instead of driving a single drive connector 350 (FIG. 3), the hard drive channel select signals 332, 334 are output by port decoder 320 to the channel select generator 460. Channel select generator 460 outputs channel select outputs CS00, CS01, CS10, CS11, CS30, CS31, CS30 and CS31.

Signals CS00 and CS01 are input to drive connector 450. Channel select signals CS10 and CS11 are input to drive connector 451. Channel select signals CS20 and CS21 are input to drive connector 452. Channel select signals CS30 and CS31 are input to drive connector 453. Additional channel select signals (not illustrated) may be provided to additional drive connectors, illustrated as element 454.

Port decoder 320 also provides "port write" signals to clock, or, as appropriate, to enable, elements 462, 472, 482 and 490. Port write signals P0WR, P1WR, P2WR are respective clock inputs to channel enable port 462, interrupt request (IRQ) enable port 472, and DMA (direct memory access) request (DRQ) enable port 482. Port read signal P3RD is the output enable of the tri-state-output interrupt status buffer 490. Also, ENABLE DMA TRANSFER and DISABLE DMA TRANSFER signals from port decoder 320 are input to the DMA arbitrator 480.

The channel enable port 462 outputs four port enable signals, PORTEN0, PORTEN1, PORTEN2, and PORTEN3, to the channel select generator 460. When one of these four PORTENx lines is true (for example, a high logic level in the illustrated embodiment), signals CSx0 and CSx1 of channel select generator 460 exactly follow the logic states of the respective HDCS0 and HDCS1 signals from the port decoder 320. In other words, a single PORTENx signal "qualifies" a set of CSx0 and CSx1 signals. This action allows the selection of any given channel, based on the logic state of these PORTENx lines.

The IRQ enable port 472 outputs four interrupt request enable signals, IRQEN0, IRQEN1, IRQEN2, and IRQEN3, to the interrupt priority resolution arbitrator 470. The interrupt priority resolution arbitrator 470 also receives interrupt requests IRQ0, IRQ1, IRQ2, IRQ3 from the disk drives, through connectors 450, 451, 452, 453. Additional interrupt requests lines may be provided in embodiments having more than four disk drives. The IRQx lines are qualified inside in the interrupt priority resolution arbitrator 470 by their respective IRQENx signals.

One additional input to the interrupt priority resolution arbitrator 470 is the DMA interrupt request DMAIRQ signal coming from the DMA arbitrator 480, the DMAIRQ signal indicating an interrupt being requested to perform DMA data transfer operations.

The interrupt priority resolution/arbitrator 470 constantly monitors the qualified IRQx lines and the DMAIRQ line, to determine which channel or channels are to be serviced. Once the determination has been made, a system interrupt request signal SYSIRQ is activated, to be received by the host processor. Concurrently, four signals IRQLV0, IRQLV1, IRQLV2 and IRQLV3 are output by the interrupt priority resolution arbitrator 470.

IRQLV3 differentiates whether the system interrupt request SYSIRQ is caused by the detection of one of the IRQx lines from the drives, or by the DMAIRQ line from DMA arbitrator 480. If IRQLV3 is 0, then SYSIRQ is an interrupt from a channel that is identified by encoding the three signals IRQLV2, IRQLV1, IRQLV0. As a first example, if the four combined IRQLVx lines present a hexadecimal value of 2H ($0010_2$, with IRQLV3 being zero), channel 2 is requesting an interrupt. On the other hand, as a second example, if IRQLV3 is set to 1 (yielding a value of $1000_2$), the interrupt priority resolution arbitrator 470 is processing a DMAIRQ interrupt, when a DMA operation is being requested to the host. In this case, the requesting channel is identified through the logic state of the three DRQLV2, DRQLV1, DRQLV0 lines, as will be apparent from the description of the DMA arbitrator 480 presented below.

After the system interrupt request SYSIRQ is asserted to the host, the SYSIRQ signal will stay active until the source of the interrupt (IRQx or DMAIRQ) is removed. No arbitration is performed during this period of time.

The DMA arbitrator 480 receives DMA requests from the disk drives on lines DRQ0, DRQ1, DRQ2, and DRQ3 via respective drive connectors 450, 451, 452, and 453. These DRQx lines are qualified inside the DMA arbitrator 480 with associated DRQEN0, DRQEN1, DRQEN2, DRQEN3 signals provided by the DRQ enable port 482. When a DRQx line is set active by a drive, and if it is qualified (passed by an AND gate or similar functional element) by a corresponding DRQENx, the DMA request is entered into a pool with other qualified DRQx, where all qualified requests await arbitration by the DMA Arbitrator 480.

The arbitration process may be implemented suitably as follows. Both the interrupt priority resolution arbitrator 470 and the DMA arbitrator 480 may use a "round-robin" technique. Such a technique grants the participating drives equal priority.

As an example of such technique, in the illustrated embodiment a 125 ns clock provided by the ISA/EISA bus is used for sequentially sampling the DRQx inputs to the DMA arbitrator 480. At every clock period, a DRQx input is sampled and tested, and, if not active, the next DRQx signal in the sequence is tested during the ensuing clock period. Finally, when a DRQx signal is found to be active, it is locked by the hardware, and no further arbitration is performed until a DISABLE DMA TRANSFER signal is received through port decoder 320.

A similar arbitration technique may be used for the interrupt priority resolution arbitrator 470. However, in contrast to the foregoing arbitration technique, after a DMAIRQ or IRQx input signal is detected to be active and is locked, arbitration is resumed. In contrast to the DMA transfer process, unlocking occurs automatically when the input signal (DMAIRQ or IRQx) which originally caused the arbitration returns to its non-active state.

In the illustrated embodiment, the next input signal of the sequence, and not the first input signal of the sequence, is sampled, thus providing equal priority for the inputs.

When the arbitration is complete, the DMA arbitrator 480 asserts its DMAIRQ output signal, sending it to the interrupt priority resolution arbitrator 470. The channel whose DMA request "wins" the arbitration is identified by the three DRQLV2, DRQLV1, DRQLV0 signals that are output to the interrupt status buffer 490. As described above, the DMAIRQ subsequently causes a host interrupt to be generated, via the interrupt priority resolution arbitrator's SYSIRQ output signal.

When servicing the interrupt, the host asserts the ENABLE DMA TRANSFER signal. This action allows the DMA arbitrator 480 to virtually connect the DRQx line from the "winning" channel to the arbitrator's SYSDRQ output signal, to start performing DMA operations. When the host acknowledges the SYSDRQ request with the SYSDACK signal, the SYSDACK signal is virtually connected to the DACKx line of the winning channel via a corresponding one of connectors 450, 451, 452, 453, 454. The DISABLE DMA TRANSFER signal also forces the DMA arbitrator 480 to stop further arbitration among qualified DRQx lines until the DMA operation is completed. Completion of the DMA operation is detectable through assertion of the DISABLE DMA TRANSFER signal issued by the Host through port decoder 320.

The interrupt status buffer 490 may be implemented as a suitable buffer with tri-state outputs enabled by the P3RD signal from the port decoder 320. The signals passing through the register allow the host to read the logic state of the four IRQLVx lines and the three DRQLVx lines.

Memory address decoder 492 is provided to map a BIOS (Basis Input/Output System) 494 into the host's system memory. The illustrated BIOS 494 is implemented as a suitable EPROM (erasable programmable read-only memory). The EPROM contains code executable by the host's CPU, code for initializing the Paddle board's hardware, providing a disk interface to the Host's Operating System, and, significantly, translating between the host operating system and the disk drive hardware.

The BIOS initially communicates with the IDE drives and decides how to logically combine the drives. In a preferred embodiment, the decision scheme is as follows. For simplicity, only the term BIOS will be referred to in this discussion, with the understanding that these tasks could also be performed by a software driver, the latter term denoting a more generic concept of software or firmware that may be implemented other than in an EPROM (Erasable Programmable Read-Only Memory), such as on a disk for loading into RAM (Random Access Memory) during initialization.

First, the BIOS interrogates each drive on the Multi-Seek IDE subsystem. Because these drives are IDE drives, they tell an interrogator their number of cylinders, number of sectors per track, and number of heads. Second, using these parameters, the BIOS computes the size of each physical drive, as well as the size and characteristics of the larger, "logical" drive. These logical drive parameters are returned to the host operating system. The BIOS also stores the drive parameters so that logical requests can later be mapped to physical requests.

More specifically, during an initialization process occurring immediately after power-up, the host processor determines the presence of a BIOS by scanning the memory range $0C8000_{16}$ through $0DFFFF_{16}$, looking for a specific "signature" (a code uniquely identifying a BIOS). Once recognized, the BIOS is granted control of the bus, whereupon it executes routines to set up the board.

In the illustrated embodiment, the BIOS is a 16K EPROM, so that system address lines SA14 through SA19 are used with the SMEMR control signal to enable the BIOS 494 by a BIOS enable signal /BIOSEN, only during memory read cycles. The /BIOSEN signal selectively enables or disables the tri-state output of the BIOS EPROM 494, the output being the 16-bit multi-seek internal data bus 400. Data on the data bus 400 may be transferred to the ISA/EISA bus 100 via transceiver 310.

Also illustrated in FIG. 4 is a buffer 440. Buffer 440 buffers I/O read, I/O write, and address signals, IOR, IOW, and SA0–SA2, respectively, onto a buffered ISA/EISA control bus 441. Bus 441 provides signals BIOR, BIOW, and A0–A2 in parallel to channel drive connectors 450, 451, 452, 453, 454, for reception by the respective disk drives.

Figure 5:
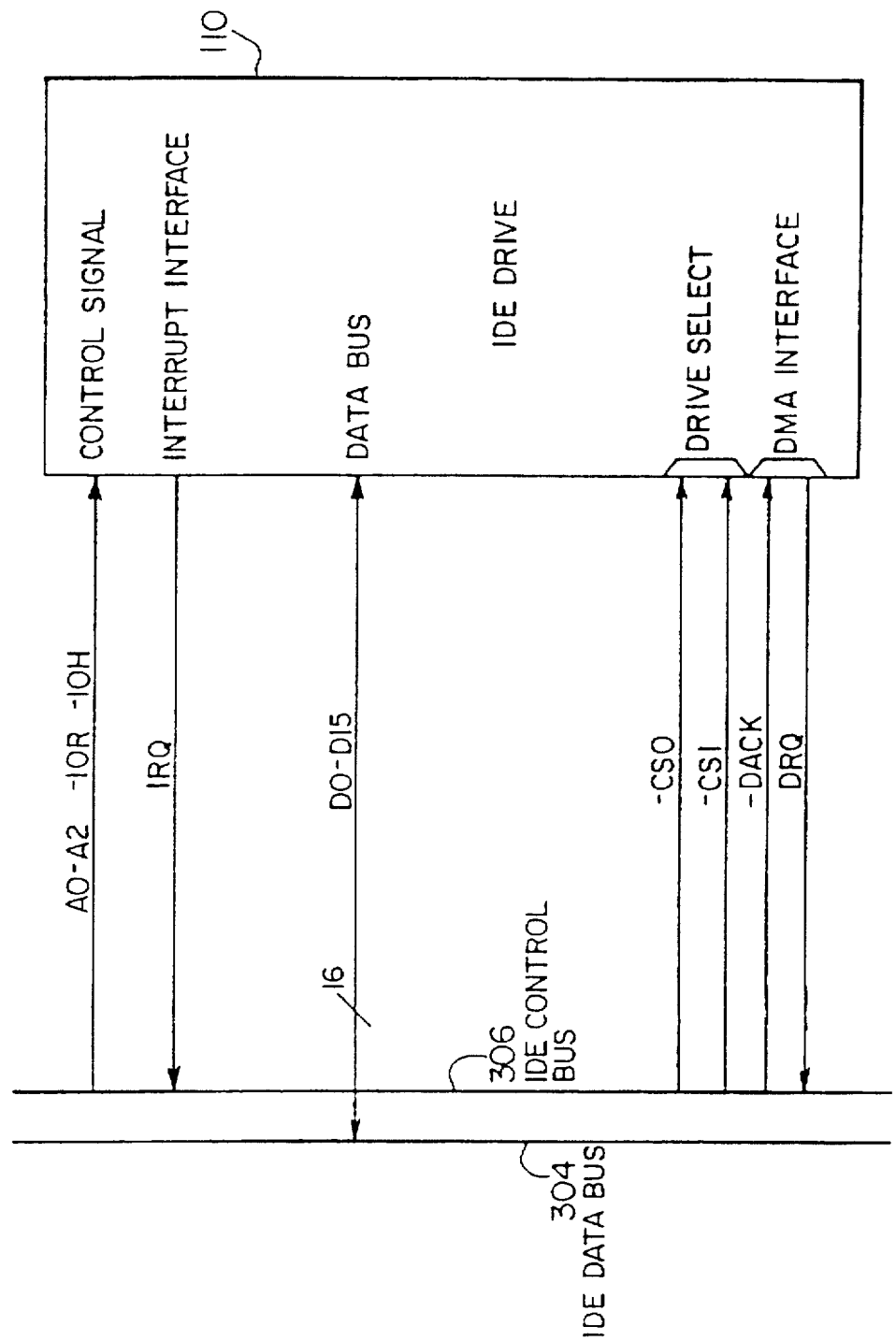
FIG. 5 illustrates a known interface to a standard IDE drive.
Figure 6:
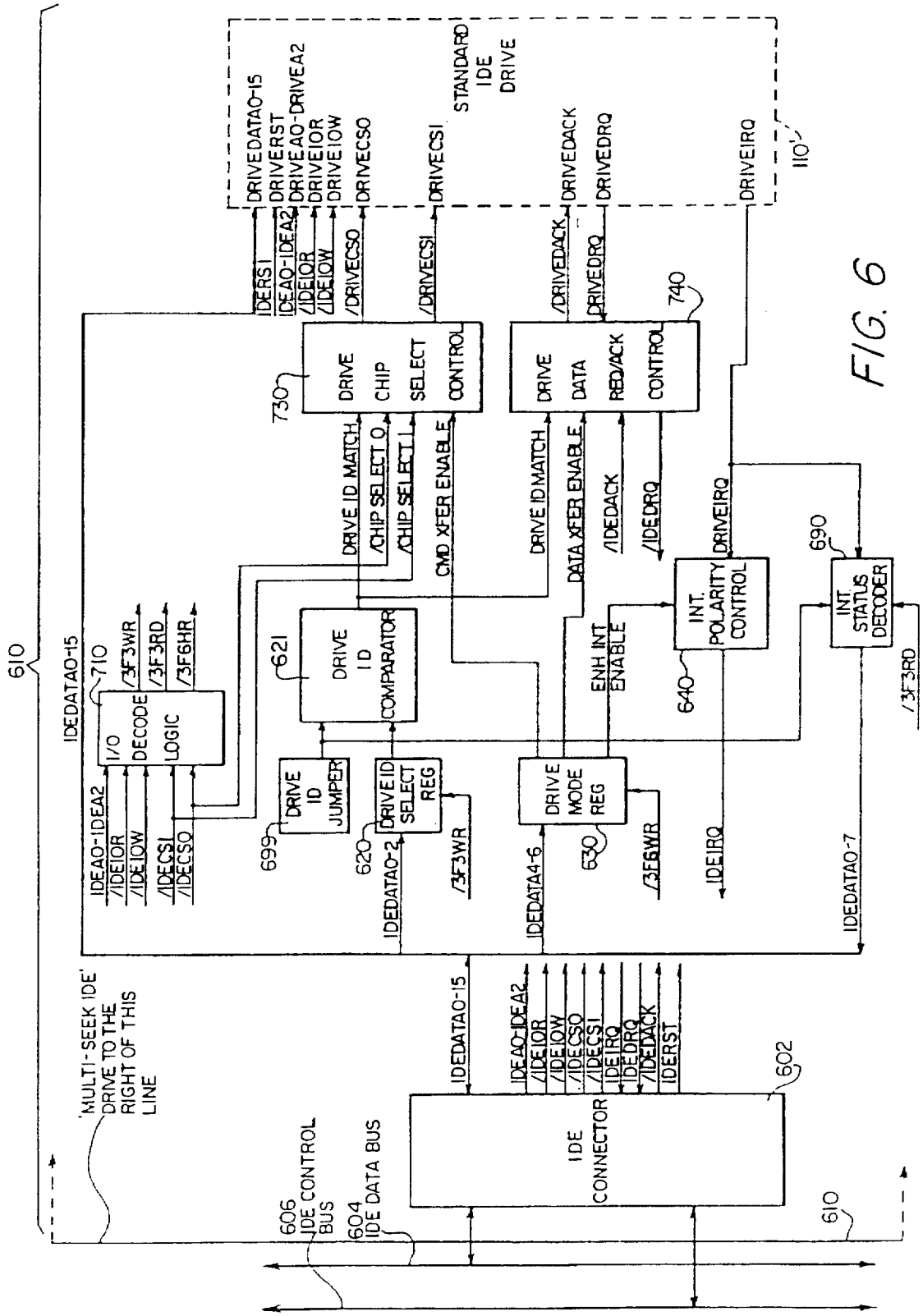
FIG. 6 is a high-level block diagram illustrating an improved interface to a standard IDE drive, according to the on-board embodiment of the present invention.

The distinctions between the present invention (the paddle board implementation of FIGS. 2A and 4) and the conventional system (in FIGS. 1 and 3) are further illustrated by a comparison of FIGS. 5 and 6 (FIG. 6 illustrating a preferred version of the on-board embodiment of the present invention).

FIG. 5 illustrates the conventional IDE drive 110 with its connection to IDE data bus 304 and IDE control bus 306. The address bits A0, A1, and A2, as well as the I/O read and I/O write signals are illustrated, passing from IDE control bus 306 to the IDE drive. These signals are passed through a suitable drive connector, such as drive connector 350 (FIG. 3). The drive's interrupt request signal IRQ is passed from the IDE drive 110 to the drive connector. The data bus, here including data bits D0 through D15, are illustrated as a bi-directional data bus extension extending between IDE data bus 304 and the IDE drive 110. Channel select inputs CS0 and CS1 pass from the drive connector to the drive select inputs of the disk drive. Finally, FIG. 5 illustrates the DMA request signal DRQ passing from the disk drive to the IDE control bus for passage to the drive connector, as well as the DMA acknowledge signal DACK passing in the reverse direction.

FIG. 6 illustrates what may be termed an "extended" IDE drive 610 (also termed a "multi-seek IDE drive" or an "enhanced IDE drive"). Reference should also be made to FIG. 2C which is a higher-level block diagram indicating the main elements of the "enhanced" drives. Specifically, each "enhanced" drive includes (1) an unenhanced driven and (2) an interface which allows multiple concurrent seeks to take place on the plural unenhanced drives in the system. The extended IDE drive 610 includes a standard IDE drive 110', with additional circuitry. The additional circuitry, illustrated in FIG. 6, converts and/or processes certain signals leaving and entering an IDE connector 602 so that the signals entering and leaving the standard IDE drive 110' are standard signals. As such, the conversion and processing of the signals allows the software driver in the host to communicate with plural standard IDE drives, without concern for translating the signals itself.

Operation of the circuitry shown in FIG. 6 may be understood as follows, with special attention paid to the interrupt scheme.

Passage of IDE address bits IDEA0, IDEA1, and IDEA2, the reset signal IDERST, as well as I/O read and I/O write signals /IDEIOR and /IDEIOW from the drive connector to the "conventional" drive 110' are as described in the conventional system, and need not be further described here.

An interrupt request signal DRIVEIRQ issued by the disk drive 110' passes through interrupt polarity control logic 620 (as discussed in detail below), to become IDEIRQ that is passed to the IDE connector 602.

The interrupt request signal DRIVEIRQ is also passed to an interrupt status decoder 690. Interrupt status decoder 690 also receives a drive ID including an appropriate number of bits so as to distinguish the present conventional IDE drive 110 from other conventional IDE drives in the system.

In the illustrated embodiment, the drive ID is defined by a plurality of jumpers in a jumper array 699. The jumper array 699 for each conventional drive is set to a unique number, so as to distinguish it from other drives.

The interrupt status decoder 690 provides the interrupt status to the extended IDE data bus 604, in the following manner. Interrupt status decoder 690 includes a set of tri-state-output driver/buffers connected to the bus. All the inputs of these driver/buffers are connected to the DRIVEIRQ signal that is output by the drive 110'. However, only one of the driver/buffers within decoder 690 is enabled, as determined by the /3F3RD signal from an I/O decoder 710 and a drive ID from jumper set 699. The determination of which driver/buffer is selected, is made by decoding the three DRIVE ID input lines from drive ID jumper block 699. Further, the identified driver/buffer is only enabled when the 3F3RD signal is active. Using this arrangement, the host determines which drives are generating interrupts, by reading port 3F3 and polling for all active bits in that port.

The drive data request/acknowledge control logic 740 in FIG. 6 converts the disk drive's DMA request DRIVEDRQ to a suitable modified DMA (direct memory access) request signal IDEDRQ which is provided to the drive connector. Also, the drive data request/acknowledge control logic 740 handles the return DMA acknowledge signal /IDEDACK, and provides a suitable modified DMA acknowledge signal /DRIVEDACK back to the drive's DMA interface. Drive data request/acknowledge control logic 740 functions only when the DRIVE ID MATCH and DATA XFER ENABLE signals, described below, are active.

A drive select register 620 is provided, to receive a drive select data word from data bus 604. When the current drive ID matches the data received on the input to drive select register 620, drive ID comparator 621 activates its DRIVE ID MATCH signal to enable the circuitry on FIG. 6 to perform its functions with the knowledge that the current drive is being selected by the software driver. In particular, the DRIVE ID MATCH is output to enable drive chip select control block 730 and drive data request/acknowledge control block 740.

A drive mode register 630 is also provided. Drive mode register 630 receives, for example, three data bits from data bus 604. Drive mode register 630 provides a command transfer enable signal CMD XFER ENABLE and a data transfer enable signal DATA XFER ENABLE to drive chip select control block and drive data request/acknowledge control blocks 730 and 740, respectively. These signals, never being active simultaneously, enable only one of control circuits 730 or 740 at a time. In this manner, drive mode register 630 governs operation based on whether a command or data are received from the host processor.

Drive mode register 630 also provides an enhanced interrupt enable signal to the interrupt polarity control logic 620. The enhanced interrupt enable signal allows the host processor to remotely switch the polarity and type of the interrupt signal IDEIRQ. Depending on the embodiment of the invention being used, the polarity of the interrupt signal is important. The interrupt line coming out from a standard IDE drive is defined as a tri-state active high signal. Conversely, in embodiments using enhanced IDE drives, in order for all disk drives to interrupt the host through a single interrupt line, the polarity should be active low and open-collector. Remote switching of the polarity of the interrupt signal's polarity is thus achieved within interrupt polarity control logic 620 using any appropriate logic device having a programmable inverting function.

I/O address decoder 710 is provided to govern operation of the drive ID select register 620, the drive mode register 630, and the interrupt status decoder 690. I/O address decoder receives address bits 0–2 from the IDE address bus via the connector 602. It also receives the IDE I/O read and I/O write signals /IDEIOR, /IDEIOW, which time I/O transfers to and from the drive. Finally, decoder 710 receives channel select signals /IDECS0 and /IDECS1, which specify selection of the first or second (such as master and slave) IDE drive in a standard IDE pair configuration.

During operation, I/O address decoder 710 provides clocking and enable signals to the drive ID select register 620, the drive mode register 630, and the interrupt status decoder 690. The drive ID is registered into drive ID register 620 by decoder 710's output signal /3F3WR. The drive mode register registers the drive mode and interrupt enable information based on decoder 710's output signal /3F6WR. Finally, the interrupt status decoder registers the drive ID information and drive interrupt request DRIVEIRQ based on decoder 710's output /3F3RD; the output of decoder 690 can be held inactive by /3F3RD so as not to interfere with bus operations.

The I/O decoder 710 may be implemented as a simple decoder combining inputs /IDEA0, /IDEA1, /IDEA2, /IDECS0 and /IDECS1 to provide its output signals /3F3WR, /3F3RD, and /3F6WR. Its output signals /3F3WR, /3F3RD, and /3F6WR, used as timing inputs to various elements in FIG. 6, may be decoded according as follows. 3F3WR is active when the input address lines are $011_2$ and both /IDECS1 and /IDEIOW are active. 3F3RD is active when the input address lines are $011_2$ and both /IDECS1 and /IDEIOR are active. Finally, 3F6WR is active when the input address lines are $110_2$ and both /IDECS1 and /IDEIOW are active. Signal IDECS1 is active when the address range 3F0 through 3F7 is decoded, and IDEIOW and IDEIOR are simply signals respectively identifying the I/O write and I/O read cycles performed by the host.

The channel select signals /IDECS0 and /IDECS1 also pass directly to the drive chip select control logic 730, allowing it to generate the standard /DRIVECS0 and /DRIVECS1 for the standard IDE drive 110', when active in conjunction with the DRIVE ID MATCH and CMD XFER ENABLE signals, described above. Internally, drive chip select control logic 730 may comprise two AND gates (or equivalent circuits performing an AND function). The inputs to a first AND gate producing the /DRIVECS0 output signal are the /IDECS0, DRIVE ID MATCH, and CMD XFER ENABLE signals. Similarly, the inputs to a second AND gate producing the /DRIVECS1 output signal are the /IDECS1, DRIVE ID MATCH, and CMD XFER ENABLE signals. In short, the IDE channel select signals /IDECSx are passed through to become respective /DRIVECSx when the jumper ID matches the ID registered in register 620 and when command transfers are allowed.

Drive data request/acknowledge control logic 740 may be simply implemented so as to produce its IDEDRQ output by including a first AND circuit receiving as its inputs DRIVEDRQ, DRIVE ID MATCH, and DATA XFER ENABLE. Similarly, drive data request/acknowledge control logic 740 may produce its /DRIVEDACK output by including a second AND circuit receiving as its inputs /IDEDACK, DRIVE ID MATCH, and DATA XFER ENABLE.

The "enhanced" (multi-seek) IDE drive configuration of the "on-board" embodiment (FIGS. 2C, 2D and 6) may be contrasted to the "standard" IDE drive configuration of the "paddle board" embodiment (FIGS. 1, 2A, 2B, 4 and 5), each providing certain advantages.

The on-board embodiment provides the advantage that all drives may be connected by a single cable, carrying the IDE bus. On the IDE bus, as the tern implies, all signals may be shared among the enhanced IDE drives, including the interrupt signals, the DMA request and DMA acknowledge signals, and the IDE data bus signals. Advantageously, as enabled by the circuitry described above, the invention provides that the sharing of signals does not allow different drives on the bus to interfere with each other or with communication on the bus to and from the host. As described in greater detail below, the interrupt polarity control logic 620 allows the "wiring-OR" of the programmable interrupt lines from the various enhanced drives. The interrupt status decoder 690 provides the host with easy identification of any interrupting drive. The drive chip select control logic 730 prevents the "standard" IDE drive 110' (shown in phantom in FIG. 6) that constitutes a part of the "enhanced" drive, from controlling the bus when it has not been specifically identified via the drive ID comparator 621. The drive DMA request/acknowledge control logic 740 ensures that only the properly chosen drive can assert a DMA request and receive a DMA acknowledge.

An important feature of the "enhanced" IDE drive is that interrupt polarity is programmable. Programmable interrupt polarity allows use of both standard IDE interrupt mode (which is active high) and enhanced IDE interrupt mode (which is active low). Active low interrupt polarity allows interrupt sharing among drives. Without interrupt sharing, the on-board multi-seek IDE scheme could not be implemented without adding signals to the IDE interface itself; significantly, according to the present invention, enhanced multi-seek IDE drives advantageously use unmodified standard IDE connectors and cables.

Advantageously, an enhanced IDE drive may be used in place of a standard IDE drive in the conventional master-slave IDE configuration, thus providing backward compatibility. This is achieved because the enhanced IDE drive's interrupt mode would default to the standard polarity, so the pair would work properly together. However, when attaching drives in a bus configuration (in parallel, as in the illustrated on-board embodiment), if any one drive uses the interrupt polarity of enhanced IDE drives, then all drives on the bus should likewise use the same polarity interrupt scheme, to prevent system deadlock.

The on-board embodiment, using "enhanced" IDE drives, handles only one interrupt per drive, the interrupt being enabled by the matching of the drive ID select register 620 and the drive ID jumper 699. (The daisy chained enhanced IDE drives may have two IDE drives per channel.) In contrast, because the paddle board embodiment supports multiple drives, arbitration logic is provided for governing multiple interrupts, port and channel selection, and DMA operations.

The paddle board embodiment includes several IDE connectors leading to a respective standard drives in what may be termed a "star configuration". Interrupt lines are not shared, but the interrupts from different drives are arbitrated on the paddle board, and the interrupts may be identified, selected, and serviced. Therefore, to the host, it appears that only a single drive has asserted an interrupted even if more than one has in fact asserted an interrupt. The paddle board's "buffering" of interrupts is in contrast to the on-board embodiment, in which the host may interrogate interrupt status decoders 690 from the various bussed enhanced IDE drives. In the on-board embodiment, the host may find that more than one bit is set by the interrupt status decoders, thus quickly and directly learning that it must in fact service more than one drive interrupt.

The paddle board embodiment also provides arbitration for DMA data transfer logic. This feature is not provided in the illustrated on-board embodiment, so that the host determines which drives requests the data transfer operation and enables that drive.

Thus, in view of the foregoing comparison, it is apparent that the on-board embodiment provides a simple configuration of standard cables and connectors, with the host performing software monitoring tasks. The paddle board embodiment provides logic to quickly determine which type of operation needs to be performed, thus relieving the host of certain monitoring tasks.

Figure 7:
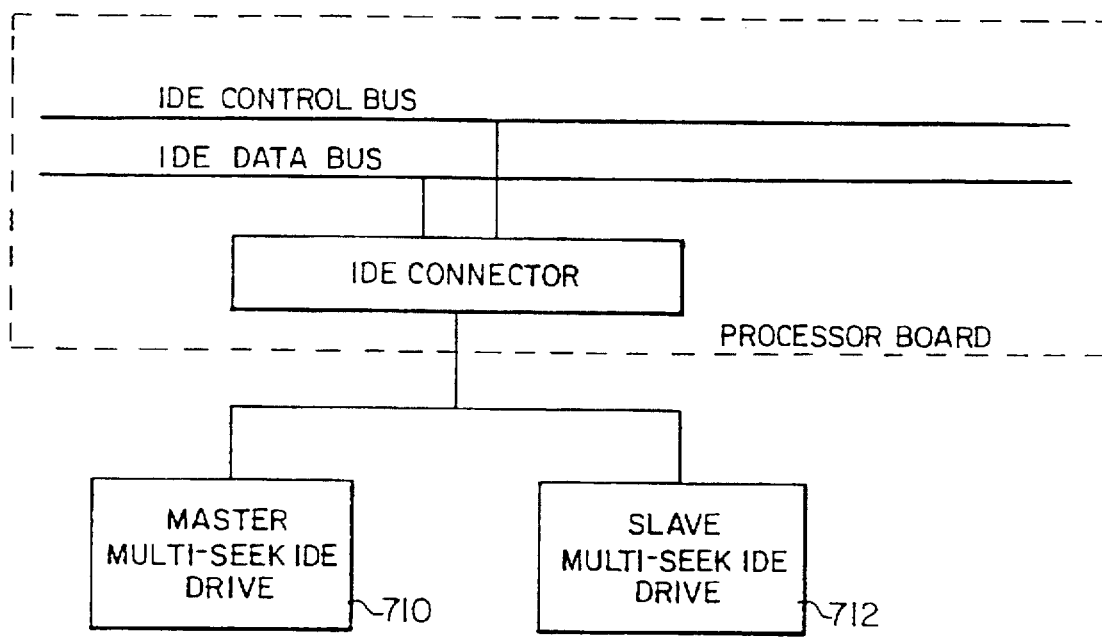
FIG. 7 is a block diagram illustrating connection of master and slave Multi-seek IDE disk drives in a configuration supported by the present invention.

FIG. 7 is provided to show how the invention supports the typical IDE "master-slave" configuration. A first, "master" multi-seek IDE disk drive 710 is provided, connected in parallel to the IDE bus with a second, "slave" multi-seek IDE drive 712. Each multi-seek IDE drive 710, 712 is preferably implemented as in FIG. 6, described above.

Figure 8:
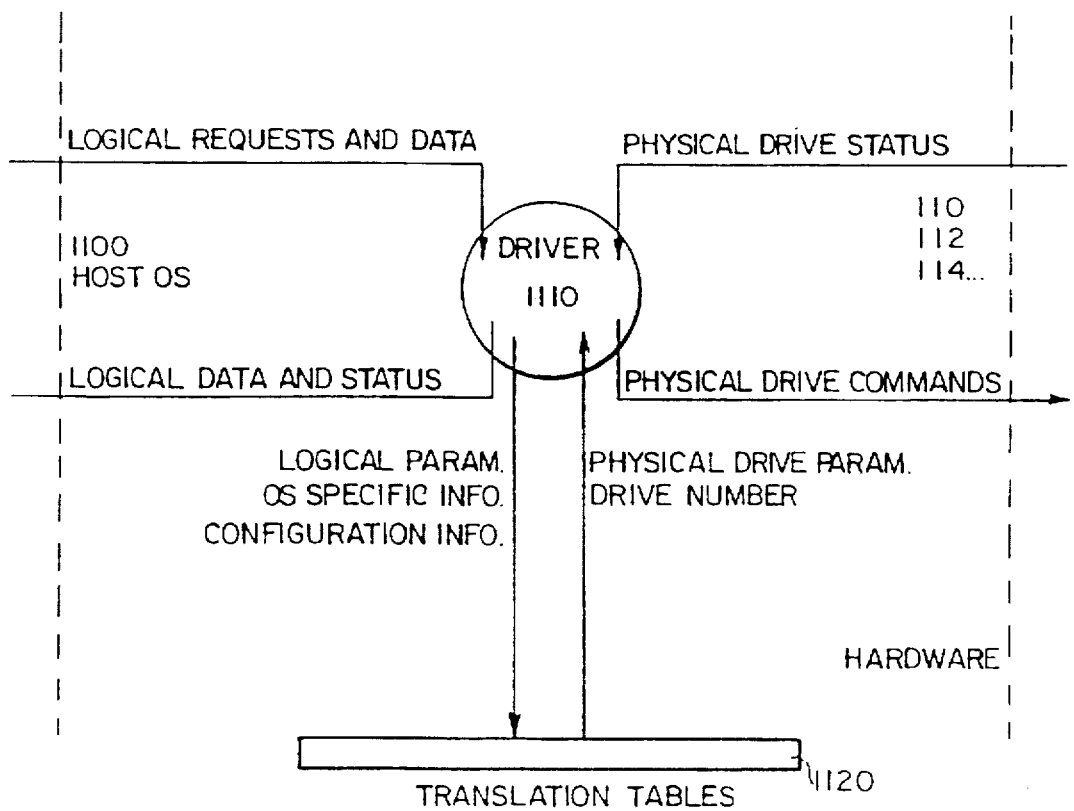
FIG. 8 is a context diagram schematically illustrating how the preferred software driver resides between the host operating system and the disk drive hardware.

FIG. 8 is a context diagram schematically illustrating the multi-seek unit's placement between the host operating system 1100 and the disk drive hardware, here numbered 110, 112, 114, . . . As shown in FIG. 8, the host operating system 1100 issues logical requests and data, and receives logical data and status information, from a driver 1110. In response to the operating system's logical requests and data, the driver 1110 provides physical drive commands to the disk drive hardware, and receives physical drive status information in return.

The driver 1110 essentially performs the translation between logical requests, data, and status on the operating system side, and physical commands and status on the disk drive hardware side, using various translation tables collectively indicated as element 1120. For example, translation tables 1120 include logical parameters, operation specific information, and configuration information, which may have been downloaded from the host operating system through the driver 1110 or be pre-programmed. In operation, the driver 1110 retrieves such information as physical drive parameters and associated drive numbers for use in the translation between logical and physical domains.

Figure 9:
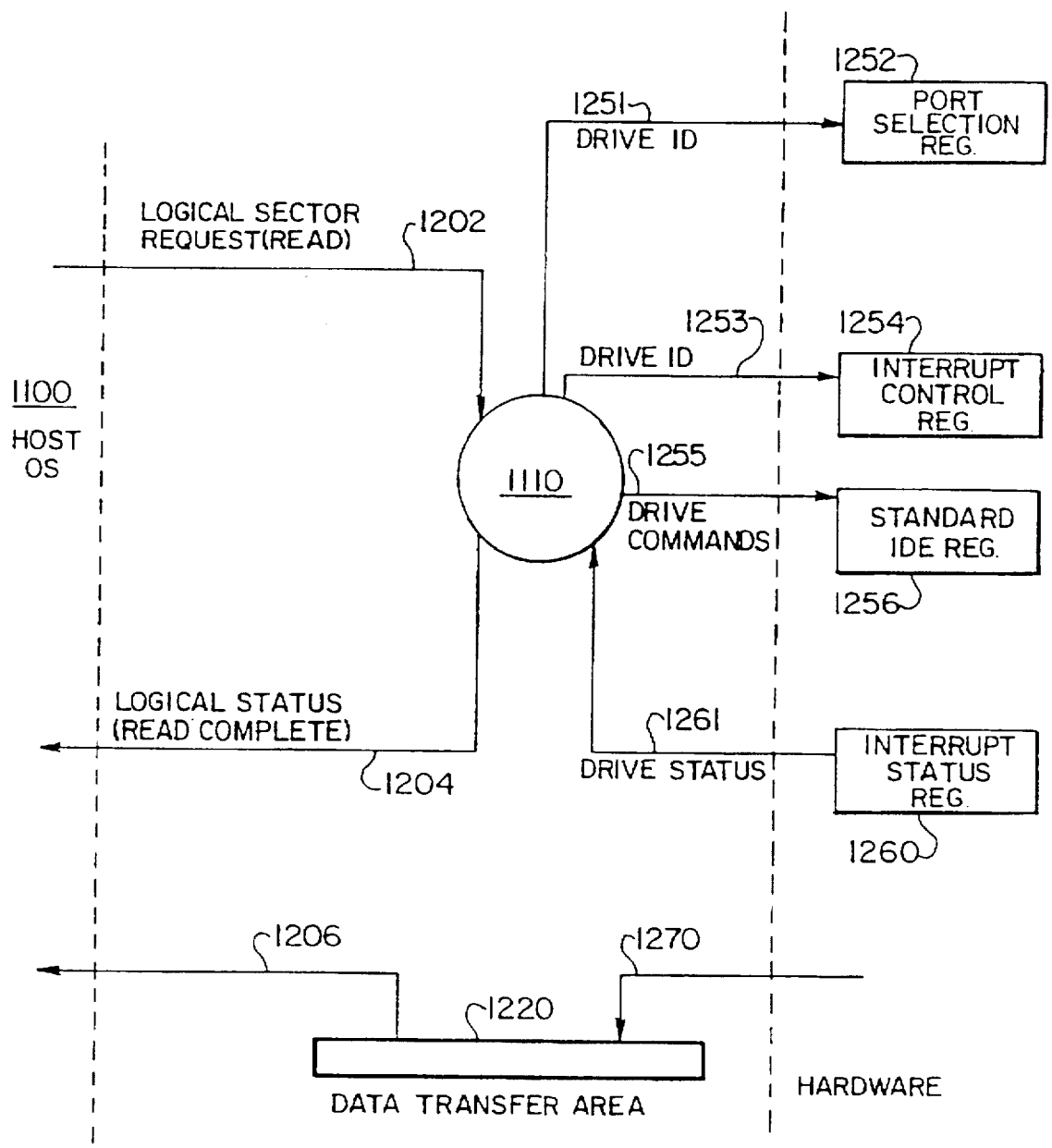
FIG. 9 schematically illustrates the data flow between the host operating system and the disk drive hardware during a read operation, as managed by a software driver according to the present invention.

FIG. 9 illustrates the data flow during a data read operation. The host operating system issues a logical sector request to the driver 1110, as illustrated on path 1202. The driver 1110 translates the logical sector requests into one or more physical sector requests. In those special cases in which a host request involves multiple physical sectors in more than one physical drive, the present invention allows for issuance of multiple physical sector requests. In particular, the drive ID is sent to both a port selection register 1252 and an interrupt control register 1254, as illustrated on paths 1251 and 1253, respectively. The particular drive command is issued to a standard IDE register 1256, on path 1255. Finally, when the drive has completed its read operation, it sets an appropriate bit in the interrupt status register 1260, which information passes to the driver 1110 on path 1261.

Upon receiving the drive status information from the drive's interrupt status register, the driver 1110 informs the host operating system on logical status line 1204, that the read operation has been completed. At this time, the driver 1110 governs transfer of data from the disk drive hardware on a path 1270 to a data transfer area 1220 in the multi-seek unit. From data transfer area 1220, the data is transferred to the host operating system, as indicated on path 1206.

Figure 10:
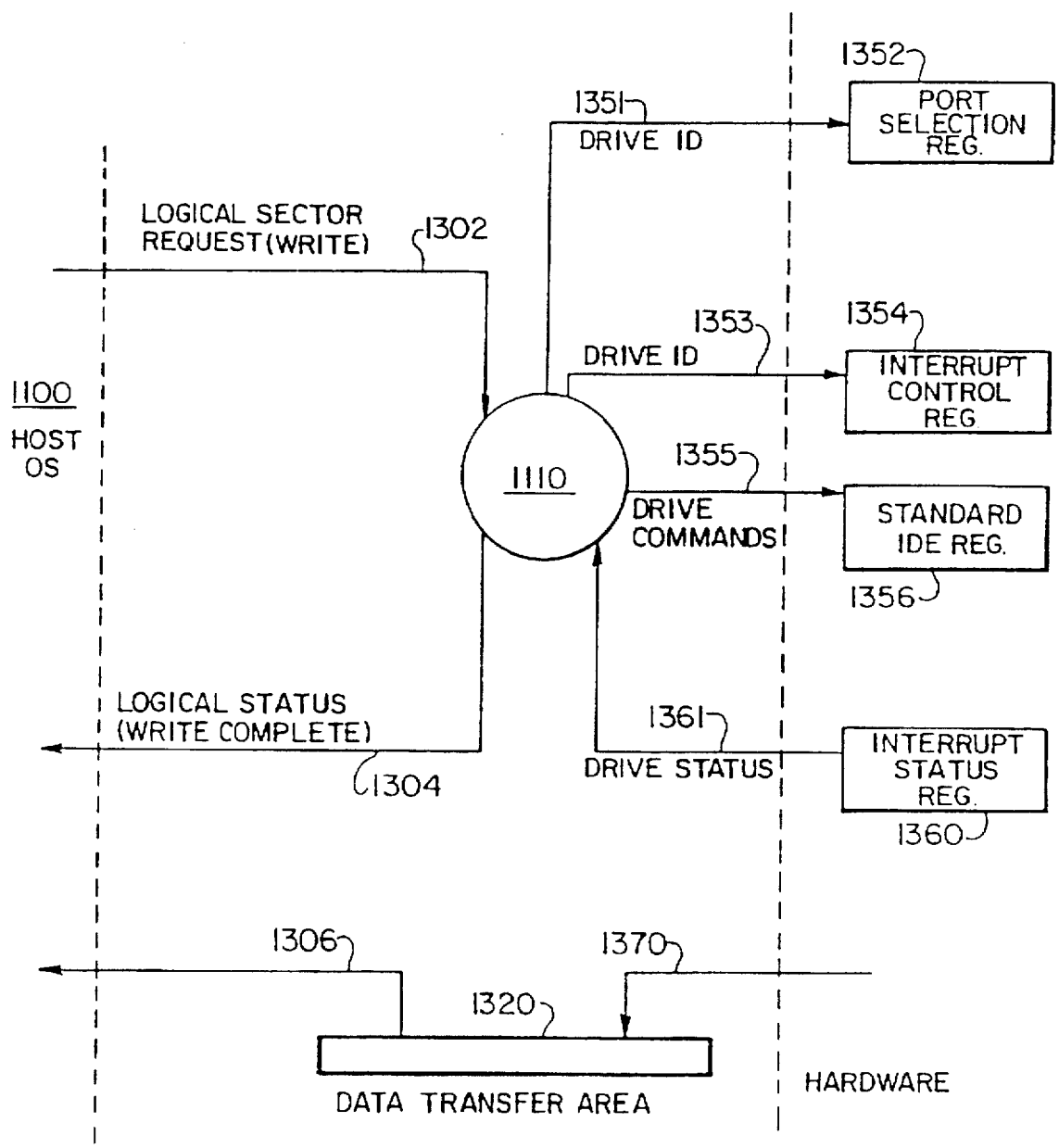
FIG. 10 schematically illustrates the data flow between the host operating system and the disk drive hardware during a write operation, as managed by a software driver according to the present invention.

FIG. 10 schematically illustrates data flow during a write operation. The host operating system 1100 issues a write request to a given logical sector, as illustrated on path 1302. Driver 1110 translates this logical sector write request into the physical domain, providing drive ID on paths 1351 and 1353 to port selection register 1352 and interrupt control register 1354, respectively. Also, particular drive commands needed to implement the logical sector write request are sent on path 1355 to a standard IDE register 1356. Assuming the physical drive is not occupied with other tasks, as indicated by status bits in interrupt status register 1360 passed over path 1361, data is transferred from the operating system to a data transfer area 1320, over a path 1306. The data for a particular drive is transferred to the drive, as illustrated on path 1370.

The registers shown schematically in FIGS. 9 and 10 correspond to the similarly-named registers (or buffers) that are shown more literally in FIGS. 4 and 6. It is understood that FIGS. 8, 9 and 10 are provided to describe certain concepts of the invention, demonstrating that the invention is not limited to the particular embodiments described with reference to FIGS. 2A–2D, 4, 6 and 7. FIGS. 11, 12, 13, and 14 illustrate exemplary arrays and tables associated with the driver software, it being understood that breadth of the invention should not be limited by the particular embodiments described.

Figure 11:
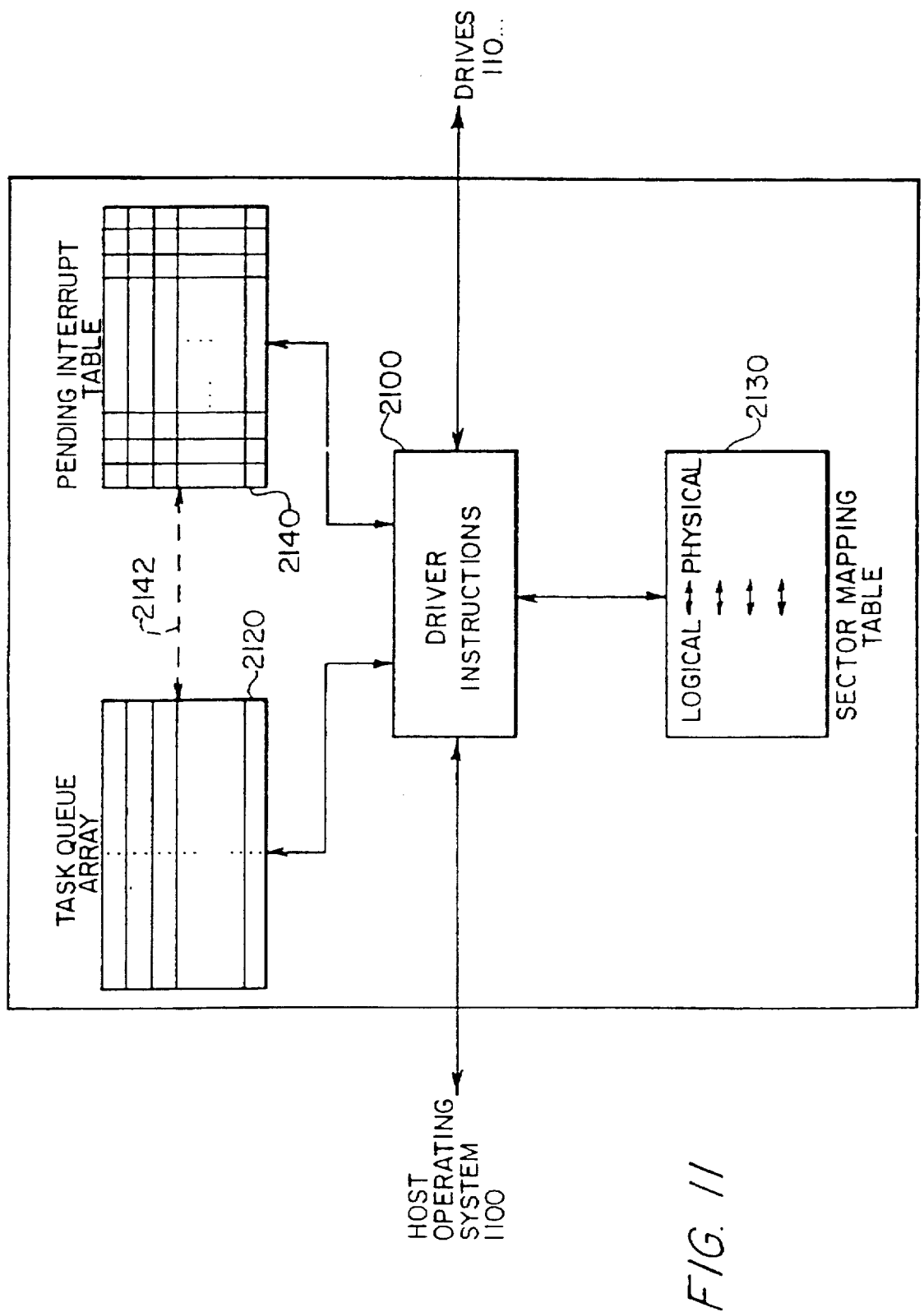
FIG. 11 schematically illustrates exemplary software architecture according to a preferred embodiment of the present invention.

Referring now to FIG. 11, the multi-seek unit software architecture is illustrated schematically. The multi-seek software includes a set of driver instructions 2100, which IDE interface of drives 110, 112, 114, and so forth. The driver instructions carry out the translation functions illustrated in FIGS. 8, 9, and 10.

Associated with the driver instructions are a number of work areas on which the driver instructions operate. During operation, instructions 2100 are executed by the host processor, which operates on a task queue array 2120, sector mapping table 2130, and pending interrupt table 2140, so as to govern interactions between the operating system logical domain and the disk drive physical domain.

The multi-seek unit software architecture includes a set of task queues, collectively indicated as element 2120. The system includes at least one task queue for each physical drive. In one embodiment, exactly one task queue is maintained for each drive; in another embodiment, separate task queues for read requests and write requests. The task queues are independently maintained, so that simultaneous seeks on different physical drives is enabled. Advantageously, the driver instructions 2100 can manipulate task queues to optimize a particular disk's performance. For example, the driver can sort the task queue so as to minimize head movement on a particular physical drive, thus improving access time. An exemplary task queue is illustrated in FIG. 12.

The task queue is used by the software drive to keep track of pending host transactions. Each task in the queue can have various host-specific items associated with it, such as priority write/read/verify. A status field is provided for use by the driver to track which channels have pending interrupts, and is kept in association with the corresponding pending interrupt table entry. An RW buffer pointer field points to locations in system memory to and from which data is to be written and read.

In FIG. 12, a particular example of a task queue is illustrated. The task queue is organized by records, one record associated with a task that has an ID number shown to the left of the record. The "host priority" field includes values indicating priority, such as time criticality. In the illustrated example, a lower number in the "host priority" field indicates a higher priority. The "status" field indicates the present status of the task, such as "pending", "retried n times", or "completed successfully". The "Assoc Int" field contains indexes to the pending interrupt table (see FIG. 14), the indexes being used to track pending interrupts for the task. Finally, the read/write buffer pointer "RWBUFFPTR" field includes an address of a memory location where the host's operating system will provide data to be written or where it can find data to be read.

A sector mapping table 2130 is also provided. An exemplary sector mapping table is illustrated in FIG. 13. The sector mapping table is used by the software driver to translate logical sector numbers used by the host operating system into physical sector numbers used by one or more disk drives. The physical sector numbers are supplemented by a specification of which of the physical drives is indicated. The sector mapping table also allows heterogeneous IDE drives to be combined into single logical drives. Optimal mappings depend on host operating system sector size, physical drive characteristics, and driver configuration.

It is understood that the sector mapping "table" is shown in the form of a table, purely for purposes of clearly demonstrating the concepts involved and facilitating the present explanation. It lies within the contemplation of the invention, however, that a function can be used in an actual embodiment, even a function that dynamically calculates physical sectors that correspond to logical "sector" requests. It is therefore to be understood that the present invention may be implemented in a manner not literally described herein, but still lie within the scope of the invention.

In FIG. 13, the "logical sector" is a number representing a logical sector to be read or written, in terms directly manipulated by the operating system. Corresponding numbers are provided in the PHYSICAL SECTOR field, each number, being in terms of the corresponding physical drive 0 through m, and denoting a sector thereof. Sequential CHANNEL numbers are also provided in the sector mapping table.

In FIG. 14, an exemplary pending interrupt table 2140 is illustrated. Driver 2100 uses the pending interrupt table to monitor which drives have interrupts pending and completes the appropriate interrupt processing. The interrupts are monitored, based on a matrix relating disk drives to transactions.

Further, mappings are kept between transactions in the pending interrupt table and appropriate structures in the task queues 2120, to maintain correspondence with the interrupting drive. The mappings between the pending interrupt disk drive structures in the pending interrupt table to appropriate task queue entries is illustrated by path 2142 (FIG. 11).

FIG. 14 illustrates an exemplary pending interrupt table 2140. In FIG. 14, each row of the pending interrupt table corresponds to a pending host transaction which is stored in the task queue 2120 (FIGS. 11, 12). In the illustrated pending interrupt table, the four less significant bits of each byte correspond to physical drives which may have pending interrupts. In the example shown, Transaction 1 has three pending interrupts: from physical drive 0, physical drive 1, and physical drive 3. The pending interrupts are illustrated by "1" bits in the appropriate location in the second row of the table, corresponding to Transaction 1. In simpler examples, Transaction 0 and Transaction 2 have no pending interrupts, so that all entries in the table corresponding to drives 0, 1, 2, and 3 are 0. Conversely, Transaction n has all bits set, indicating interrupts are pending in all disk drives for that transaction.

Figure 15:
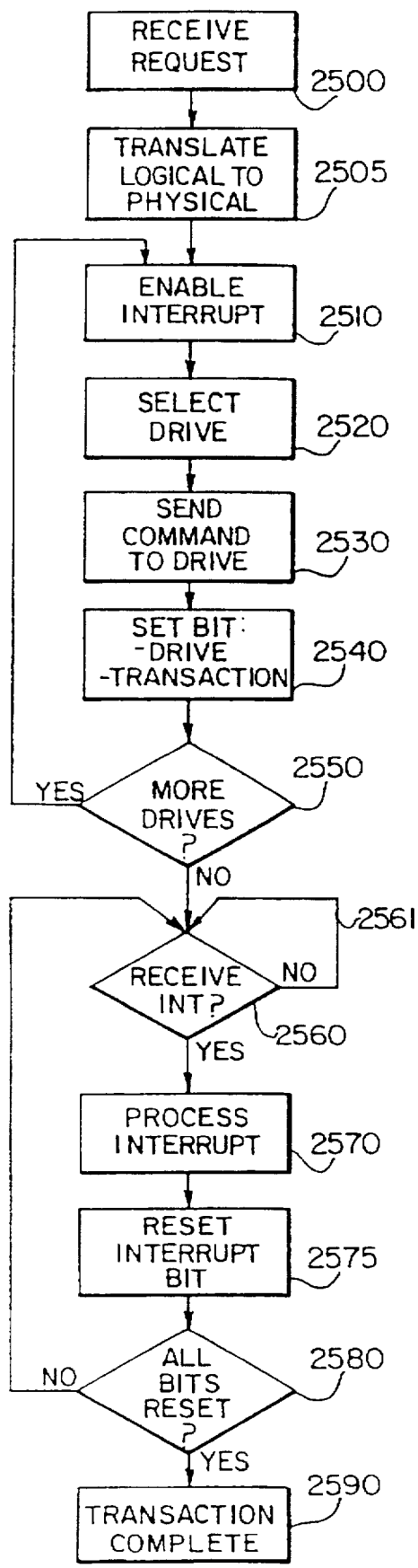
FIG. 15 is a flow chart illustrating the driver's operation using the pending interrupt table of FIGS. 11 and 14.

Referring now to FIG. 15, execution of driver instructions with reference to the pending interrupt table of FIG. 14 is illustrated in flow chart form.

At block 2500, the driver receives a read request from the operating system. At block 2505, the driver refers to the sector mapping table 2130 (FIG. 11) to determine which physical drives are involved in the read request. The driver enters a loop which is executed once for each physical drive to be accessed.

First, at block 2510, the interrupt is enabled for the drive. At block 2520, the drive is specifically selected before sending the READ command to the drive at block 2530. The driver sets the bit in the pending interrupt table which is in the column corresponding to the disk drive and in the row corresponding to the transaction (here, a read request). Decision block 2550 indicates a determination of whether there are any more drives to access to carry out the read request (transaction). The loop 2510-2550 is repeated until all disk received, the loop is repeated, as indicated along path 2561. When an interrupt is received, the driver 2100 processes the instructions, indicated at block 2570. After the interrupt processing is completed, the corresponding interrupt bit is reset, as indicated at block 2575.

Decision block 2580 represents a determination of whether all bits have been reset for a particular transaction. If there are still bits set in a row corresponding to the transaction, control passes on path 2581 back to idle loop block 2560, awaiting further interrupts. However, when all bits for a particular transaction have been reset, control passes to block 2590. At block 2590, the multi-seek unit's driver informs the operating system that the transaction is complete. Thereafter, the driver executes other instructions as needed. If other transactions are pending, control would return to idle loop block 2560. If other transactions are not pending, control passes from FIG. 15 to await reception of other requests from the operating system.

FIG. 15 is illustrated in substantially sequential form, purely for the sake of simplicity. However, it is understood that it is possible to have received an interrupt from a first disk drive in block 2560, before all disk drives have been accessed in loop 2510-2550. In this case, the interrupt from the first drive may be processed before continuing with sending commands to the other disk drives. In the preferred embodiment, the driver software is interrupt-driven, so that when one transaction is completed, the host operating system may be immediately informed. Generally, this is believed to improve overall system performance.

Figure 16:
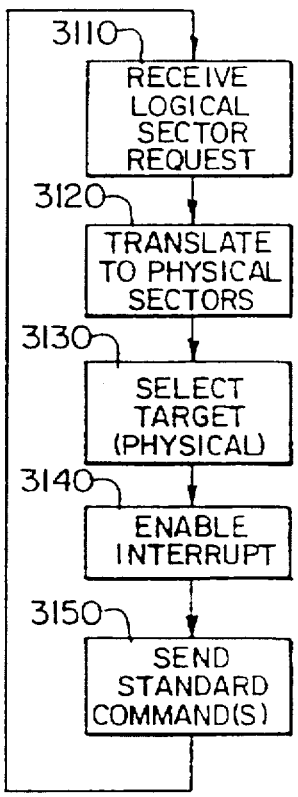
FIG. 16 is a flow chart illustrating a multi-seek driver executive according to a preferred embodiment.
Figure 17:
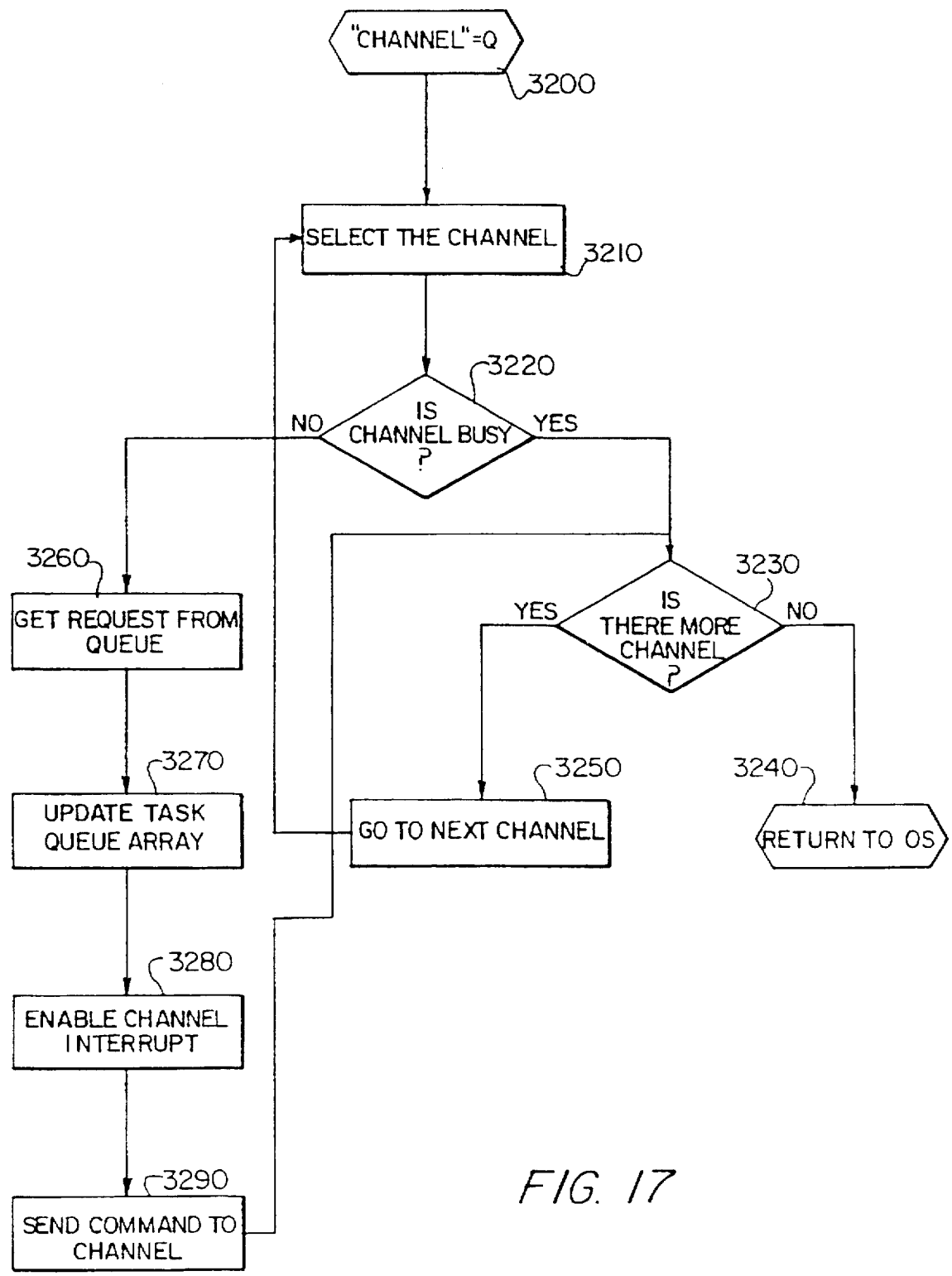
FIG. 17 is a flow chart illustrating channel request queue processing in more detail than FIG. 16.
Figure 18:
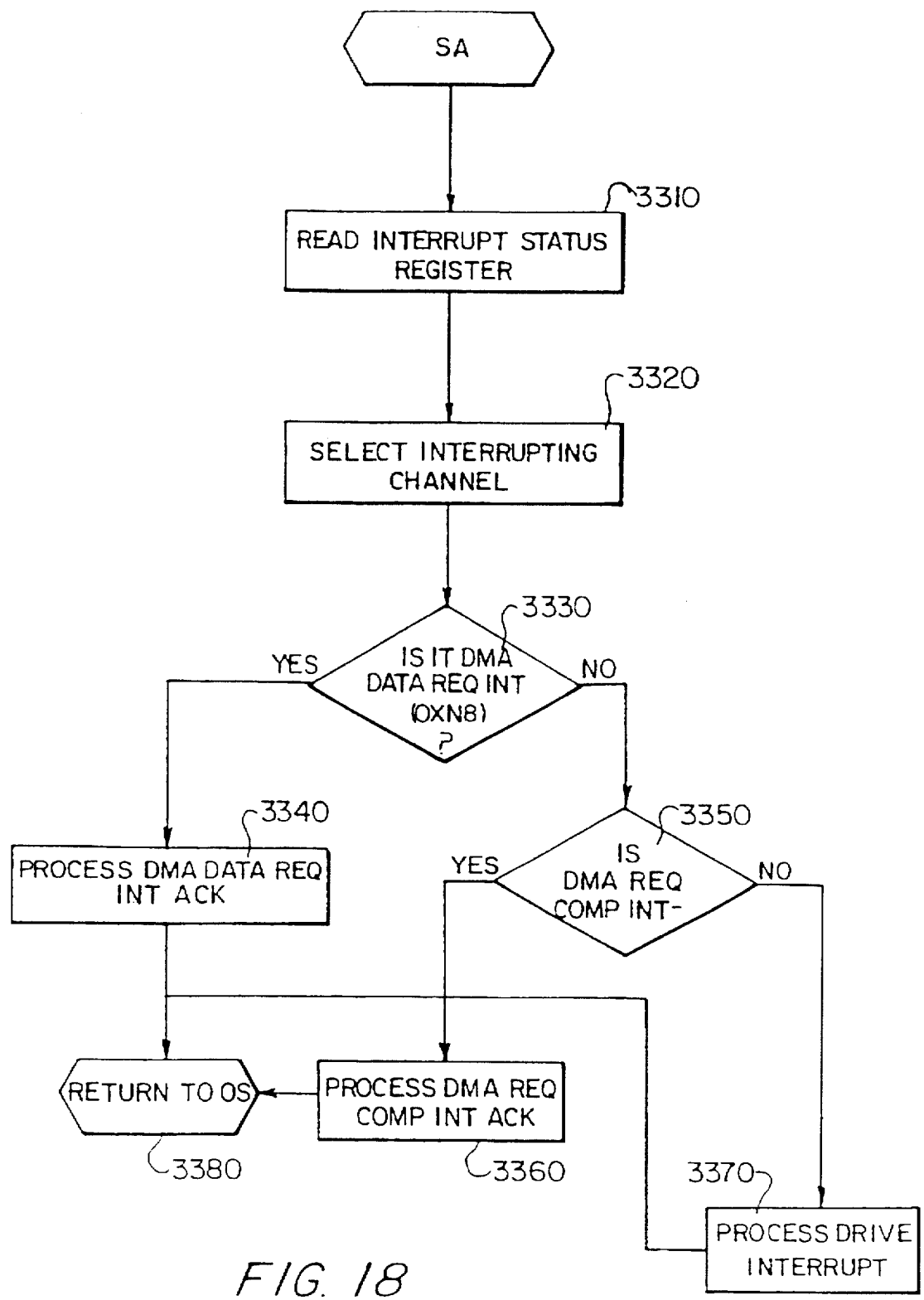
FIG. 18 is a high-level flow chart illustrating the operation of interrupt service routines, to be executed in response to completed executed command sequences.
Figure 19:
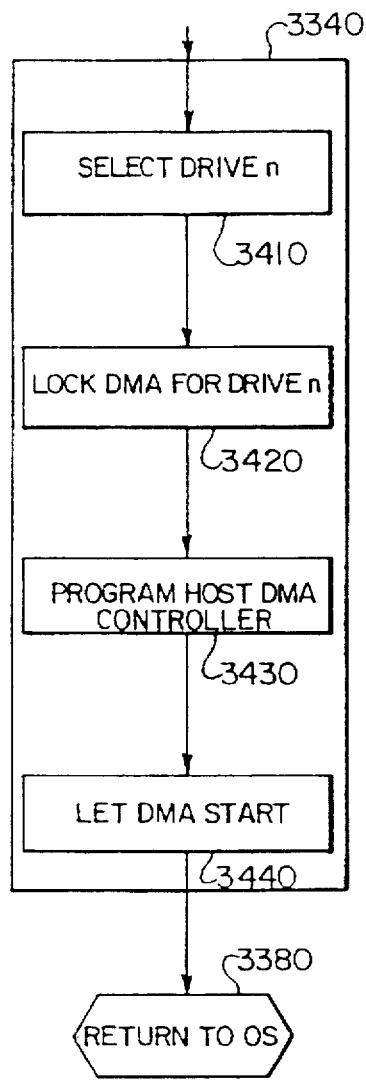
Figure 20:
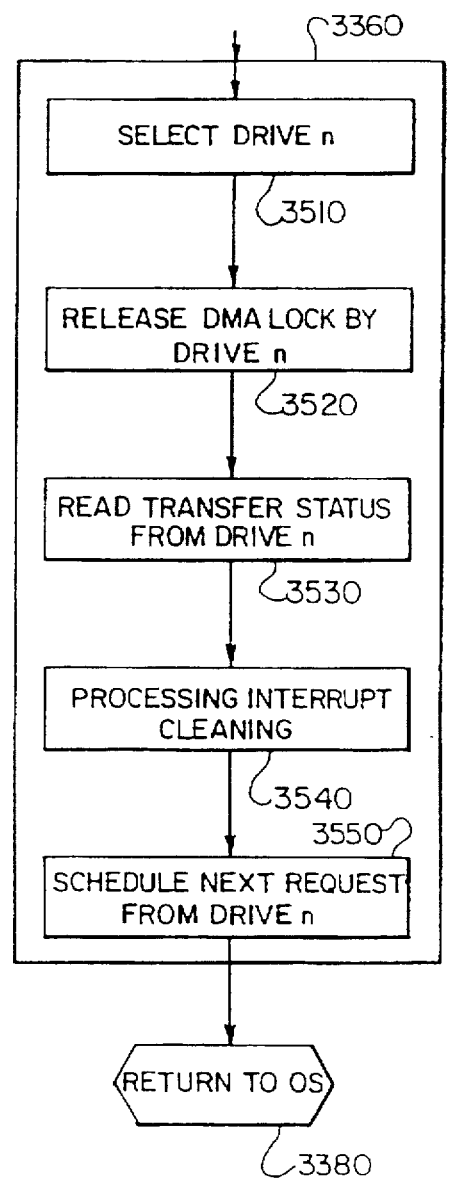
FIGS. 20, and 21 are flow charts illustrating particular interrupt service routines for DMA (Direct Memory Drives) data request interrupts, DMA request completed interrupts, and disk interrupts, respectively.
Figure 21:
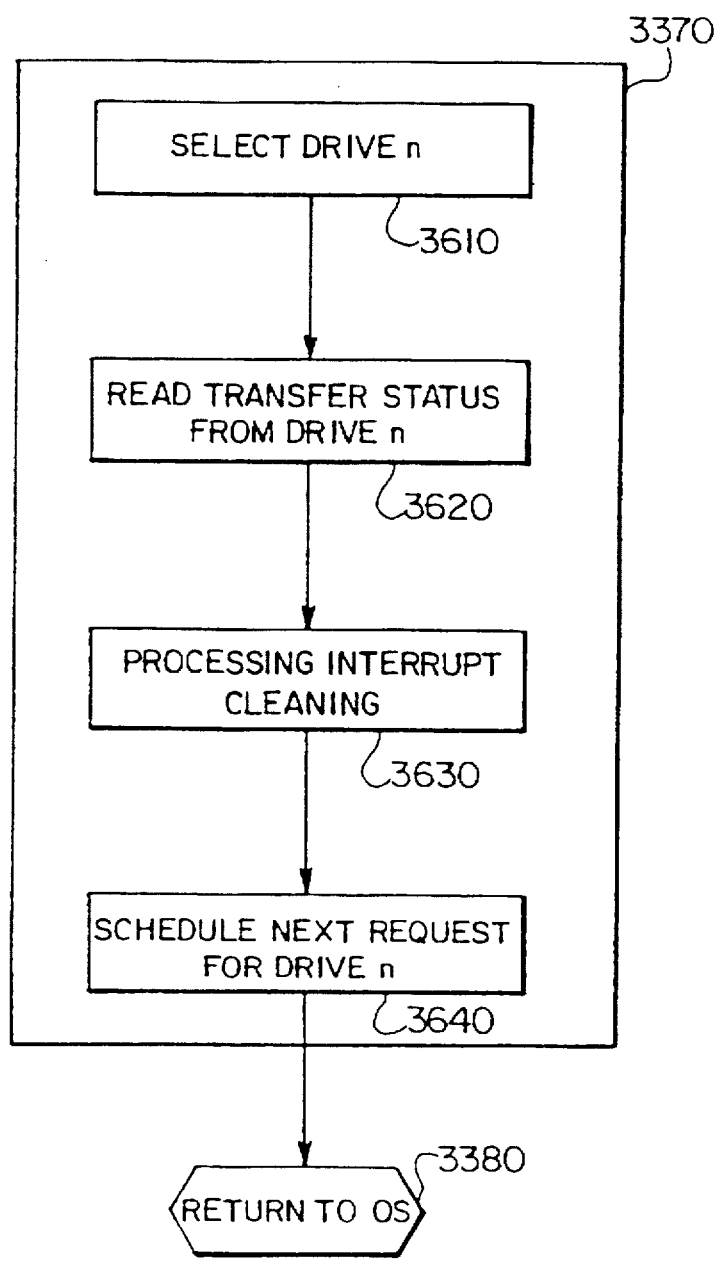

FIG. 16 is a high-level flow chart indicating a command sequence. FIG. 17 illustrates a channel request queue processing flow chart, showing more details than FIG. 16. FIG. 18 is an interrupt service routine flow chart illustrating operation of the driver in response to the command sequence in channel operations of FIGS. 16 and 17, respectively. FIGS. 19-21 illustrate particular types of interrupt service routines determined in FIG. 18.

Referring more specifically to FIG. 16, a software loop is illustrated. The software loop indicates the driver's reception of a command from the operating system and its translation into an instruction to a physical drive.

First, at block 3110, a driver receives a logical sector request from the operating system. This logical sector request may be a request to read or write information from a logical sector.

At block 3120, the driver 2100 (FIG. 11) determines where, among the physical disk drives, the logical sector resides. The driver refers to the sector mapping table 2130 (FIG. 11) so as to determine which physical drives, and which physical sectors on the drives, correspond to the logical sector specified by the operating system request.

At block 3130, the driver selects the target drive or target drives, based on the translation performed in block 3120.

At block 3140, the driver enables the interrupts for the target drive or drives. The loop illustrated in FIG. 16 is exited to process any interrupts received back from the drives.

At block 3150, the driver issues commands to the disk drives. As described with reference to FIGS. 11 and 12, the driver keeps track of the source and destinations for I/O requests in the various task queues in task queue array 2120 (FIG. 11).

The individual disk drive commands are conventional in nature and recognized by the disk drive interface without modification or adaptation. In a particular preferred embodiment, the interface is the IDE interface, and the commands are standard IDE commands. However, taken as a whole, the software loop illustrated in FIG. 16 performs functions which could not be performed if the IDE drives were connected to the operating system on a standard ISA/EISA bus in a conventional configuration. The inability of conventional systems to perform these enhanced functions was described above, with reference to FIG. 1.

FIG. 17 illustrates channel request queue processing in more detail than FIG. 16.

First, a "channel" variable is set to 0 at block 3200. At block 3210, the particular channel which is requested is selected. Decision block 3220 determines whether the selected channel is busy.

If the channel is busy, control passes to decision block 3230. Decision block 3230 determines whether there are any more channels to be processed. If there are no more channels to be processed, control passes to block 3240, indicating a return of control to the operating system. If, however, there are other channels to be processed and the present channel is busy, the "channel" variable is incremented at block 3250, and control returns to block 3210 so that the next channel is selected.

If the selected channel is not busy, as determined by decision block 3220, control passes to block 3260. At block 3260, the driver retrieves a request from the appropriate task queue corresponding to the selected disk drive (channel). Then, the driver updates the Task Queue Array, as indicated at block 3270. The channel interrupt for the selected channel is enabled at block 3280. Finally, at block 3290, the command is sent to the channel.

After the command is sent to the channel, control passes to block 3230 to determine if there are any more channels to be processed.

FIG. 18 is a flow chart illustrating the interrupt service routine executed in response to the command sequence and channel request of FIGS. 16 and 17. Essentially, FIG. 18 illustrates the determination of whether FIG. 19, 20, or 21 should be executed in response to an interrupt.

Upon entering the interrupt service routine, the driver reads the interrupt status register at block 3310. Based on which bit is set in the interrupt status register, the driver selects the interrupting channel, as indicated at 3320.

At block 3330, the driver determines whether the interrupt is a DMA data request interrupt. In the preferred embodiment, this is done by interrogating a particular data bit, here, 0xn8, where 0x refers to a hexadecimal representation and n refers to the physical drive that is selected.

If the interrupt is in fact a DMA data request interrupt, the DMA data request interrupt is processed at block 3340. The details of block 3340 are illustrated below, with reference to FIG. 19.

If, however, the interrupt is not a DMA data request interrupt, control passes to decision block 3350. Block 3350 determines whether the interrupt is a DMA request completed interrupt. If the interrupt is a DMA request completed interrupt, control passes to block 3360, in which the interrupt is processed according to FIG. 20.

Finally, if the interrupt is not a DMA request completed interrupt or a DMA data request interrupt, control passes to FIG. 21, on the assumption that the interrupt is a disk interrupt. Block 3370 symbolically illustrates the processing of the disk interrupt, the details of which are shown in FIG. 21.

After the interrupts are processed in one of blocks 3340, 3360, or 3370, control returns to the operating system, as indicated at block 3380.

Referring now to FIG. 19, the DMA data request interrupt service flow chart is illustrated.

Upon entering FIG. 19 from FIG. 18 element 3340, the driver selects drive n, where n represents the physical drive which causes the interrupt as determined by a reading of the interrupt status register in block 3310 (FIG. 18). At block 3420, the DMA is locked, so as to prevent possible multiple DMA requests.

In FIG. 19, a DMA data request interrupt is generated when the drive is ready for a DMA transfer. DMA access is locked throughout the servicing of this interrupt, so as to ensure each individual DMA is completed without interruption. The host's DMA controller initiates the requested DMA transfer. The driver software enforces a rule of sharing DMA usage among the drives, by "locking" the DMA channel until a given direct memory access process has been completed. If the DMA access is locked, another DMA data request interrupt from another channel (disk drive) will not be serviced until the current one is fully serviced.

By unlocking the DMA channel, other disk drives may be involved in DMA transfers, or the same disk drive may be involved in a new DMA transfer. In this manner, the DMA channel is shared among the different disk drives.

At block 3430, the host DMA controller is programmed from the driver, in accordance with principles known to those skilled in the art. Essentially, block 3430 indicates a preparation of the host processor is a system for a direct memory access.

At block 3440, the DMA process is started, allowing the host's associated memory to be read directly without intervention by the host CPU.

Finally, at block 3380, control returns to the operating system. A previous DMA request may not finish before a DMA data request interrupt acknowledge to the operating system. Control can return to the Operating system, pending DMA interrupt completion.

FIG. 20 illustrates the DMA request completed interrupt service routine. Essentially, FIG. 20 illustrates the operations performed when a direct memory access has been completed, and the disk drive has sent an interrupt flag to indicate its completion. The blocks shown in FIG. 20 are executed within block 3360 (FIG. 18).

First, at block 3510, drive n is selected, where n is the physical drive causing the interrupt indicating completion of the DMA request. At block 3520, the DMA is unlocked, allowing further DMA requests to occur for that particular drive.

At block 3530, the driver reads the transfer status from the interrupting physical drive, in the interrupt status register. If successful, the Pending Interrupt Table is updated; if not, "retry" logic is exercised, as described below.

At block 3540 (assuming the transfer status read in block 3530 indicates a successful DMA), various "housekeeping" chores are performed. Of course, as appreciated by those skilled in the art, if the transfer status indicated some error, control would pass to a suitable error response routine or a repetition of the DMA data request, this possibility not being specifically illustrated in FIG. 20.

Finally, the next request for the physical drive is scheduled, at block 3550. At this point, the drive is essentially cleared for reception of further commands from the operating system.

FIG. 21 is a flow chart illustrating the details of block 3370 (FIG. 18). At block 3610, drive n is selected, where n is the number of the drive causing the interrupt. At block 3620, the transfer status is read from drive n. At block 3630, various "housekeeping" tasks are processed, to deal with the interrupt. Finally, at block 3640, the next request for the drive is scheduled, before control returns to the operating system.

Thus, it is seen that the present invention provides a first embodiment of a computer system having a processor board having a host processor, a first bus, and software (such as a software driver or BIOS) normally allowing only a single seek operation at a time to be performed for the processor, and a plurality of drives. This first embodiment of the invention also includes a multi-seek interface unit, preferably implemented as a "paddle board", interposed electrically between the first bus and the drives, the multi-seek interface board including means for interfacing the first bus to the drives, and for allowing plural seek operations to be concurrently performed on respective plural drives for the processor using the software.

The invention provides a second embodiment of a computer system including a processor board having a host processor, a first bus, and software (such as a software driver or BIOS) normally allowing only a single seek at a time operation to be performed for the processor. The computer system also has a plurality of enhanced drives, each enhanced drive including a drive, and means for interfacing the first bus to the drive, and for allowing plural seek operations on respective plural drives to be concurrently performed for the processor using the software.

Modifications and variations of the above-described embodiments of the present invention are possible, as appreciated by those skilled in the art in light of the above teachings. For example, the particular hardware used to embody the functions described herein may be varied, while still remaining within the scope of the invention. Also, the so-called "paddle board" embodiment need not be particularly implemented as a separate printed circuit board as illustrated in the drawings, but the functions described in the embodiment may be allocated physically and electrically as suits a particular application. Similarly, the "on-board" embodiment need not be particularly implemented as described or illustrated exactly as described above, and variations such as those involving non-use of all signals on a common bus may be made while remaining within the scope of the invention. Moreover, the "translation" between physical hardware and the operating system need not be implemented as a BIOS EPROM, but may be otherwise designed and/or distributed differently than as described above, in accordance with principles known to those skilled in the art. It is therefore to be understood that, within the scope of the appended claims and their equivalents, the invention may be practiced otherwise than as specifically described.

What is claimed is:

1. An arrangement in a computer system for allowing multiple concurrent seek operations to be performed, the arrangement consisting essentially of:

a) a processor connected to a bus and executing software normally allowing only a single seek operation at a time to be performed for the processor; and b) a plurality of enhanced disk drives, each enhanced disk drive consisting essentially of:
 1) an unenhanced disk drive having means for performing the seek operations; and
 2) means for interfacing the bus to the unenhanced disk drive and for allowing plural seek operations on respective plural unenhanced drives to be concurrently performed for the processor using the software.

2. A computer system, comprising:

a) a processor connected to a bus and executing software normally allowing only a single seek operation at a time to be performed for the processor; and b) at least three enhanced disk drives, each enhanced disk drive including:
 1) an unenhanced disk drive within a respective one of the at least three enhanced disk drives, the unenhanced disk drive having means for performing a respective one of at least three seek operations; and
 2) means, within a respective one of the at least three enhanced disk drives, for directly interfacing the bus to a respective one of at least three unenhanced disk drives, and for allowing the at least three seek operations on respective ones of the at least three unenhanced drives to be concurrently performed for the processor using the software.

3. The system of claim 2, wherein:

each of the unenhanced disk drives in the at least three enhanced disk drives is an unenhanced IDE disk drive.

4. The system of claim 2, wherein:

at least three interfacing and allowing means, within respective ones of the at least three enhanced disk drives, collectively allow performance of the at least three concurrent seek operations without being controlled in common by shared selection devices outside the processor, bus and enhanced disk drives.

5. A computer system, comprising:

a) a processor connected to a bus and executing software normally allowing only a single seek operation at a time to be performed for the processor; and b) a plurality of enhanced disk drives, each enhanced disk drive including:
 1) an unenhanced disk drive within a respective one of the plurality of enhanced disk drives, the unenhanced disk drive having means for performing a respective one of plural seek operations; and
 2) means, within a respective one of the plurality of enhanced disk drives, for directly interfacing the bus to a respective one of a plurality of unenhanced disk drives, and for allowing the plural seek operations on respective ones of the plurality of unenhanced drives to be concurrently performed for the processor using the software;

wherein at least some of the unenhanced drives in the plurality of enhanced disk drives have storage-retrieval geometries that are different from storage retrieval geometries of the other unenhanced drives.

6. The system of claim 5, wherein:

a part of the storage-retrieval geometries which differs between at least some of the unenhanced drives includes speed of rotation of disks in the respective unenhanced drives.

7. The system of claim 5, wherein:

a part of the storage-retrieval geometries which differs between at least some of the unenhanced drives includes information storage capacity of disks in the respective unenhanced drives.

8. The system of claim 5, wherein:

a part of the storage-retrieval geometries which differs between at least some of the unenhanced drives includes a quantity of heads present in the respective unenhanced drives.

9. The system of claim 5, wherein:

a part of the storage-retrieval geometries which differs between at least some of the unenhanced drives includes a rotational position of disks with respect to heads in the respective unenhanced drives.

10. The system of claim 5, wherein:

plural interfacing and allowing means, within respective ones of the plurality of enhanced disk drives, collectively allow the plural concurrent seek operations to be performed without being controlled in common by shared selection devices outside the processor, bus and enhanced disk drives.

* * * * *